United States Patent
Hirota et al.

(10) Patent No.: US 9,660,517 B2
(45) Date of Patent: May 23, 2017

(54) DC-AC CONVERSION DEVICE, CONTROL CIRCUIT CONTROLLING OPERATION OF DC-AC CONVERSION DEVICE, AND CONTROL METHOD FOR CONTROLLING OPERATION OF DC-AC CONVERSION DEVICE

(71) Applicants: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

(72) Inventors: Masayoshi Hirota, Osaka (JP); Tatsuya Izumi, Osaka (JP)

(73) Assignees: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

( * ) Notice: Subject to any disclaimer, the term of this patent is extended or adjusted under 35 U.S.C. 154(b) by 0 days.

(21) Appl. No.: 14/767,859

(22) PCT Filed: Feb. 25, 2014

(86) PCT No.: PCT/JP2014/054423
§ 371 (c)(1),
(2) Date: Aug. 13, 2015

(87) PCT Pub. No.: WO2014/132943
PCT Pub. Date: Sep. 4, 2014

(65) Prior Publication Data
US 2015/0372584 A1   Dec. 24, 2015

(30) Foreign Application Priority Data
Feb. 26, 2013   (JP) .................... 2013-036063

(51) Int. Cl.
*H02M 1/00* (2006.01)
*H02M 1/15* (2006.01)
(Continued)

(52) U.S. Cl.
CPC ............... *H02M 1/32* (2013.01); *H02M 1/15* (2013.01); *H02M 3/158* (2013.01);
(Continued)

(58) Field of Classification Search
CPC ... H02M 2001/0067; H02M 2001/007; H02M 1/12; H02M 1/14; H02M 1/143;
(Continued)

(56) References Cited

U.S. PATENT DOCUMENTS 5,852,558 A * 12/1998 Julian ................. H02M 7/5387
363/132
6,208,529 B1   3/2001 Davidson
(Continued)

FOREIGN PATENT DOCUMENTS

EP   2434604 A1   3/2012
JP   2001-204170 A   7/2001
(Continued)

OTHER PUBLICATIONS

International Search Report in International Application No. PCT/JP2014/054423, dated Jun. 3, 2014.
(Continued)

*Primary Examiner* — Jessica Han
*Assistant Examiner* — David A. Singh
(74) *Attorney, Agent, or Firm* — Venable LLP; Michael A. Sartori; F. Brock Riggs

(57) ABSTRACT

Provided is a DC-AC conversion device capable of reducing ripple current output from a battery.
A DC-AC conversion device, including a DC-DC conversion circuit having a full bridge circuit, a DC-AC conversion
(Continued)

circuit converting DC voltage output from the DC-DC conversion circuit into AC voltage, a coil with one end connected to one DC terminal of the DC-DC conversion circuit, and a capacitor connected between the other end of the coil and the other DC terminal, comprises: a short-circuit control part controlling switching so that a leg of the full bridge circuit is temporarily short-circuited; a phase reverse control part controlling switching of the full bridge circuit so that a phase of AC voltage output from the full bridge circuit is reversed, after the leg of the full bridge circuit is temporarily short-circuited; and a short-circuit duration variation part varying a duration for which the leg of the full bridge circuit is short-circuited at a specific cycle according to a cycle of AC voltage output from the DC-AC conversion circuit.

10 Claims, 16 Drawing Sheets

(51) Int. Cl.
    *H02M 3/335*    (2006.01)
    *H02M 1/32*    (2007.01)
    *H02M 7/5387*    (2007.01)
    *H02M 3/158*    (2006.01)
    *H02M 7/537*    (2006.01)

(52) U.S. Cl.
    CPC ....... *H02M 3/33592* (2013.01); *H02M 7/537* (2013.01); *H02M 7/53871* (2013.01); *H02M 2001/007* (2013.01); *Y02B 70/1475* (2013.01)

(58) Field of Classification Search
    CPC .......... H02M 1/15; H02M 1/32; H02M 3/156; H02M 3/158; H02M 7/537; H02M 7/5387; H02M 7/53871; H02M 7/66; H02M 7/68; H02M 7/757
    USPC .......... 363/13, 34, 37, 50, 52, 53, 55, 56.01, 363/56.02, 56.03, 56.04, 56.05; 361/1, 2, 361/5, 6, 7, 15, 18, 35, 36, 88, 89, 90
    See application file for complete search history.

(56) References Cited

U.S. PATENT DOCUMENTS

| | | | | |
|---|---|---|---|---|
| 6,330,170 | B1* | 12/2001 | Wang | H02J 9/062 363/17 |
| 6,898,095 | B2* | 5/2005 | Bijlenga | H02M 7/48 363/132 |
| 7,764,527 | B2* | 7/2010 | Takayanagi | H02M 7/797 323/267 |
| 7,796,410 | B2* | 9/2010 | Takayanagi | H02J 7/0013 307/66 |
| 2002/0176261 | A1* | 11/2002 | Norrga | H02M 7/758 363/17 |
| 2007/0086222 | A1* | 4/2007 | Iida | H02J 7/022 363/37 |
| 2011/0267862 | A1* | 11/2011 | Roesner | H02M 7/487 363/132 |
| 2012/0201056 | A1* | 8/2012 | Wei | H02P 21/0003 363/37 |
| 2012/0300502 | A1* | 11/2012 | Shimada | H02M 1/4258 363/17 |
| 2013/0063995 | A1* | 3/2013 | Norrga | H02M 1/32 363/125 |
| 2014/0368131 | A1* | 12/2014 | Katsumata | B60L 11/1814 318/51 |

FOREIGN PATENT DOCUMENTS

| | | |
|---|---|---|
| JP | 2008-263683 A | 10/2008 |
| JP | 2010-068568 A | 3/2010 |
| JP | 2010-178566 A | 8/2010 |
| JP | 4670582 B2 | 4/2011 |
| JP | 2012-070518 A | 4/2012 |
| WO | 2014073257 A1 | 5/2014 |

OTHER PUBLICATIONS

Extended European Search Report in counterpart European Patent Application No. 14756680.6, dated Feb. 23, 2017.

Su et al., "Modeling of Contactless Power Transfer Systems with a Phase-Shifted Control Method", Transactions of China Electrotechnical Society, vol. 23, No. 7, pp. 92-97, Jul. 2008 [Cited in Notification; w/ English abstract].

Notification of the First Office Action in counterpart Chinese Patent Application No. 201480010677.1, dated Feb. 21, 2017.

* cited by examiner

DC-AC CONVERSION DEVICE, CONTROL CIRCUIT CONTROLLING OPERATION OF DC-AC CONVERSION DEVICE, AND CONTROL METHOD FOR CONTROLLING OPERATION OF DC-AC CONVERSION DEVICE

This application is the national phase under 35 U.S.C. §371 of PCT International Application No. PCT/JP2014/054423 which has an International filing date of Feb. 25, 2014 and designated the United States of America.

BACKGROUND OF THE INVENTION

1. Field of the Invention

The present invention relates to a DC-AC (Direct Current-Alternating Current) conversion device for converting DC voltage into AC voltage by switching control of a full-bridge circuit, to a control circuit controlling the operation of the DC-AC conversion device and control method.

2. Description of Related Art

Plug-in hybrid electric vehicles (PHEV) and electric vehicles (EV) have become more popular and prevalent, in which an AC-DC conversion device for converting AC voltage supplied from a commercial power supply for household into DC voltage is mounted to charge a battery with the DC voltage obtained from by conversion in the AC-DC conversion device.

In recent years, it has been expected for a battery of a plug-in hybrid electric vehicle or an electric vehicle to be utilized as a power source for disaster relief or emergency. In order to use a battery as an emergency power source, it is necessary to bidirectionally perform conversion from AC voltage into DC voltage and from DC voltage into AC voltage.

A bidirectional AC-DC conversion device which converts AC voltage into DC voltage and vice versa by performing bidirectional AC-DC conversion is proposed. The proposed bidirectional AC-DC conversion device includes: a conversion circuit which functions as a power factor improvement circuit at the time of charging a battery and functions as an inverter circuit at the time of discharging the battery; and an insulated bidirectional DC-DC conversion circuit. The bidirectional DC-DC conversion circuit includes two full bridge circuits located on both sides of a voltage converter, the full bridge circuits serving as an inverter and a rectifier circuit, respectively. More specifically, at the time of charging a battery, the full bridge circuit on the side of an AC power supply functions as an inverter, whereas the full bridge circuit on the side of the battery functions as a rectifier circuit. At the time of discharging a battery, the full bridge circuit on the side of the battery functions as an inverter, whereas the full bridge circuit on the side of the AC power supply functions as a rectifier circuit. The full bridge circuit on the side of the battery is further provided with a capacitor for smoothing at the time of charging or for decoupling at the time of discharging.

However, in the proposed bidirectional AC-DC conversion device, when charging a battery, excessive ripple current flows in a capacitor, which may thereby be damaged.

Another bidirectional AC-DC conversion device that solves the problem as described above is proposed. The other proposed bidirectional AC-DC conversion device includes, in addition to a circuitry configuration similar to that in the proposed bidirectional AC-DC conversion device, a coil between a full bridge circuit on the battery side and a capacitor. A relay is connected in parallel with the coil, and a bidirectional AC-DC conversion device is configured to switch routes between the time of charging and the time of discharging with the relay. When a battery is charged, it is so switched that current flows in the coil so as to prevent excessive ripple current due to switching from flowing into the capacitor. When a battery is discharged, the relay is turned on to avoid accumulation of energy in the coil, and to prevent the occurrence of excessive surge voltage from the coil due to the switching control, which may otherwise cause damages in the full bridge circuit.

Furthermore, another bidirectional AC-DC conversion device including, in addition to a circuitry configuration similar to that in the first proposed bidirectional AC-DC conversion device, a coil located in a full bridge circuit on the battery side.

SUMMARY OF THE INVENTION

However, in the second proposed bidirectional AC-DC conversion device a relay needs to be added, which makes the configuration complicated.

Moreover, in the conventional bidirectional DC-DC conversion circuit, in the case where voltage conversion by controlling duty ratio cannot be performed and where the voltage values of AC voltage and DC voltage to be input/output to/from the bidirectional AC-DC conversion device are prescribed, a problem may be caused. Even if the voltage applied to the full bridge circuit is controlled by pulse width modulation (PWM), charges are stored in a parasitic capacitance of a switching element which has been turned off during the ON period of the PWM control, and therefore current is held because of the charges stored in the parasitic capacitance even in a period for which the voltage is turned off. Thus, voltage conversion by the PWM control cannot be performed. While it is understood that the voltage value to be output can be changed by changing the turn ratio of the coil constituting the voltage converter, if the voltage value of the DC voltage which may be output is set high, the AC voltage which may be output will be low, possibly making it impossible to perform voltage conversion to satisfy a prescribed voltage value.

Moreover, in the third proposed bidirectional AC-DC conversion device, energy accumulated in the coil by the switching control is applied to the full bridge circuit as surge voltage, which may damage the full bridge circuit.

Under such circumstances, the present inventors have conceived an idea of providing a full bridge circuit including a capacitor through a coil on the DC input/output side of a bidirectional AC-DC conversion device and predetermined switching control is performed, to prevent a capacitor from being damaged by ripple current, to prevent the full bridge circuit from being damaged by surge voltage without an addition of a component such as a relay, and also to raise the AC voltage to be output.

However, when a capacitor and coil are provided on the DC input/output side of the bidirectional AC-DC conversion device, ripple current included in the current to be output from the battery is increased as a load is increased, causing a problem of decrease in the power factor. Further, increase of ripple current may cause a problem of shortening the battery life. In the case where the frequency of the AC voltage output from the bidirectional AC-DC conversion device is 60 Hz, ripple current of 120 Hz is generated. It is possible, in general, to reduce the ripple current by increasing the capacitance of the capacitor for decoupling, which however causes a problem of increase in cost. The problem of ripple current is not limited for the bidirectional AC-DC conversion device, and a similar problem occurs in the DC-AC conversion device provided with the capacitor and coil described above on the DC voltage input side.

The present invention has been made in view of the circumstances described above, and aims to provide a DC-AC conversion device including a full bridge circuit provided with a capacitor on the DC input side through a coil, in which predetermined switching control may be performed to reduce ripple current output from a battery without increase in the capacitance of the capacitor, and a control circuit for controlling operation of DC-AC conversion device.

The invention in the present application concerns a DC-AC conversion device, comprising a DC-DC conversion circuit having a full bridge circuit and converting DC voltage applied to a DC terminal pair of the full bridge circuit to output the converted DC voltage, a DC-AC conversion circuit converting DC voltage output from the DC-DC conversion circuit into AC voltage and outputting the converted AC voltage, a coil with one end connected to one terminal of the DC terminal pair, and a capacitor connected between another end of the coil and another terminal of the DC terminal pair, further comprising: a short-circuit control part controlling switching of the full bridge circuit so that a leg of the full bridge circuit is temporarily short-circuited; a phase reverse control part controlling switching of the full bridge circuit so that a phase of AC voltage output from the full bridge circuit is reversed, after the short-circuit control part temporarily short-circuits the leg of the full bridge circuit; and a short-circuit duration variation part varying a duration for which the leg of the full bridge circuit is short-circuited at a specific cycle according to a cycle of AC voltage output from the DC-AC conversion circuit.

According to the present invention, in the configuration including a full bridge circuit provided with a capacitor through a coil on the DC input side, predetermined switching control may be performed to reduce ripple current output from the battery without increase in the capacitance of the capacitor.

DESCRIPTION OF THE PREFERRED EMBODIMENTS

Figure 1:
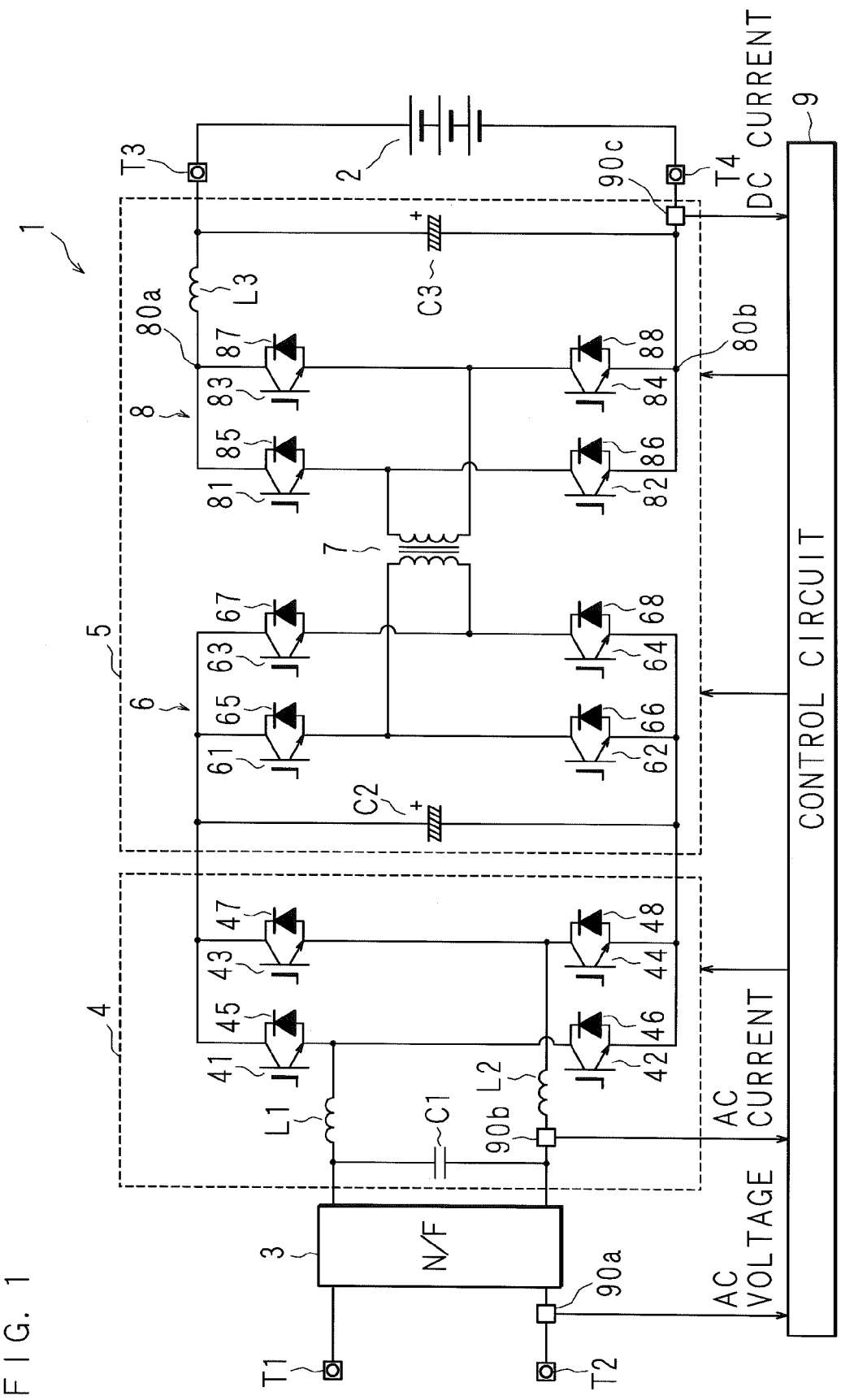
FIG. 1 is a circuit diagram illustrating a configuration example of a bidirectional DC-AC conversion device according to an embodiment of the present invention.

First, details of embodiments of the present invention will be listed and described.
(1) A DC-AC conversion device according to the present embodiment is a device comprising a DC-DC conversion circuit having a full bridge circuit and converting DC voltage applied to a DC terminal pair of the full bridge circuit to output the converted DC voltage, a DC-AC conversion circuit converting DC voltage output from the DC-DC conversion circuit into AC voltage and outputting the converted AC voltage, a coil with one end connected to one terminal of the DC terminal pair, and a capacitor connected between another end of the coil and another terminal of the DC terminal pair, further comprising: a short-circuit control part controlling switching of the full bridge circuit so that a leg of the full bridge circuit is temporarily short-circuited; a phase reverse control part controlling switching of the full bridge circuit so that a phase of AC voltage output from the full bridge circuit is reversed, after the short-circuit control part temporarily short-circuits the leg of the full bridge circuit; and a short-circuit duration variation part varying a duration for which the leg of the full bridge circuit is short-circuited at a specific cycle according to a cycle of AC voltage output from the DC-AC conversion circuit.

According to the present embodiment, the control circuit controls switching of the full bridge circuit so as to temporarily short-circuit the leg of the full bridge circuit in order to reverse the phase of the AC voltage output from the AC input/output part. That is, switching of the full bridge circuit will not temporarily block the flow of current, and the energy accumulated in a coil will not be applied as surge voltage to the full bridge circuit at the time of DC-AC conversion.

Furthermore, energy is stored in the coil during a predetermined period in which the leg of the full bridge circuit is short-circuited, and thus the AC voltage can be raised using the energy of the coil.

In addition, the duration for short-circuiting the leg of the full bridge circuit is varied at specific cycles according to the cycle of the AC voltage output from the DC-AC conversion circuit, so that the ripple current to be output from the battery to the DC terminal pair of the full bridge circuit can be reduced. In most cases, the ripple current tends to be reduced by increasing the short-circuit duration when the load current is increased and by reducing the short-circuit duration when the load current is decreased.

More specifically, in the case of the bidirectional DC-AC conversion device, since a coil is interposed between one end of the capacitor and the full bridge circuit, no excessive ripple current will flow from the full bridge circuit into the capacitor at the time of AC-DC conversion.

(2) In the DC-AC conversion device according to the present embodiment, the full bridge circuit includes: a first leg having a first switching element on a positive electrode side and a second switching element on a negative electrode side that are connected in series with each other; and a second leg having a third switching element on a positive electrode side and a fourth switching element on a negative electrode side that are connected in series with each other, and being connected in parallel with the first leg, and prior to mutual switching between an energized state where the first and fourth switching elements are in an ON state (i.e. a turned-on state) while the second and third switching elements are in an OFF state (i.e. a turned-off state), and an energized state where the first and fourth switching elements are in the OFF state while the second and third switching elements are in the ON state, the short circuit control part temporarily switches the first and second switching elements to be in the ON state (or OFF state) and switches the third and fourth switching elements to be in the OFF state (or ON state).

According to the present embodiment, prior to mutual switching between an energized state where the first and fourth switching elements are in an ON state while the second and third switching elements are in an OFF state, and an energized state where the first and fourth switching elements are in the OFF state while the second and third switching elements are in the ON state, the first and second switching elements are switched to be in the ON state (or OFF state) while the third and fourth switching elements are switched to be in the OFF state (or ON state) for a predetermined period of time, to realize a temporarily short-circuited state.

(3) In the DC-AC conversion device according to the present embodiment, a duration $\Delta T$ for which a leg of the full bridge circuit is short-circuited is represented by an equation (1) below.

$$\Delta T = \Delta T_0 + A \cdot \sin(4\pi f t) \qquad (1)$$

wherein $\Delta T$: duration for which a leg in a full bridge circuit is short-circuited $\Delta T_0$: predetermined duration $A$: variation amplitude of duration $\Delta t$ $f$: frequency of AC voltage output from a bidirectional DC-AC conversion circuit $t$: time According to the present embodiment, the duration $\Delta T$ for which the leg of the full bridge circuit is short-circuited varies in a sinusoidal shape, making it possible to effectively reduce ripple current compared to the case where the duration $\Delta T$ varies in another waveform.

(4) In the DC-AC conversion device according to the present embodiment, the short-circuit duration varying part synchronizes timing at which a phase of AC voltage output from the DC-AC conversion circuit is reversed with timing at which a rate of change in an amount of variation in the duration for which a leg of the full bridge circuit is short-circuited is at a maximum.

According to the present embodiment, variation in the duration for which the leg is short-circuited is controlled in synchronization with the control timing of the DC-AC conversion circuit. The control timing of the DC-AC conversion circuit is grasped by the DC-AC conversion device, the control of variation in the duration for short-circuiting is easier compared to the case where the synchronization timing is controlled by detecting AC voltage and specifying its phase.

(5) The DC-AC conversion device according to the present embodiment comprises a voltage detection part detecting AC voltage output from the DC-AC conversion circuit, and the short-circuit duration varying part synchronizes a zero cross point of AC voltage detected by the voltage detection part with timing at which a rate of change in an amount of variation in the duration for which a leg of the full bridge circuit is short-circuited is at a maximum.

According to the present embodiment, such a configuration that the zero cross point of the detected AC voltage is synchronized with the duration for which the full bridge circuit is short-circuited can effectively reduce ripple current even if the control timing of the DC-AC conversion circuit is different from the phase of the AC voltage to be output. For example, a phase difference occurs when cooperating with a commercial AC system.

(6) In the DC-AC conversion device according to the present embodiment, the short-circuit duration varying part includes an amplitude changing part changing a variation amplitude of a duration for which a leg of the full bridge circuit is short-circuited.

According to the present embodiment, by changing the variation amplitude of the duration for which the leg of the full bridge circuit is short-circuited, the amount of reduction in ripple current can be controlled.

(7) The DC-AC conversion device according to the present embodiment comprises: a storage part storing information in which electric power supplied from the DC-AC conversion circuit is associated with the variation amplitude; a power calculation part calculating electric power based on AC voltage and AC current output from the DC-AC conversion circuit; and an amplitude deciding part deciding the variation amplitude based on the electric power calculated by the power calculation part and information stored in the storage part.

According to the present embodiment, such a configuration that the variation amplitude of the duration for which the leg of the full bridge circuit is short-circuited is decided based on the electric power supplied from the DC-AC conversion circuit can control the amount of reduction in ripple current without a current detection part capable of detecting ripple current.

(8) The DC-AC conversion device according to the present embodiment comprises a current detection part detecting current input to the DC terminal pair, and the amplitude changing part increases the variation amplitude in a case where ripple current included in the current detected at the current detection part is in a same phase as a phase of AC voltage output from the DC-AC conversion circuit, and decreases the variation amplitude in a case where ripple current has an opposite phase to the phase of AC voltage output from the DC-AC conversion circuit.

According to the present embodiment, such a configuration that ripple current is directly detected and the variation amplitude of the duration for which the leg of the full bridge circuit is short-circuited is changed so as to decrease the ripple current can more accurately control the amount of reduction in ripple current and can effectively reduce the ripple current compared to the configuration where no ripple current is detected.

(9) A control circuit according to an embodiment is a circuit controlling operation of a DC-AC conversion device comprising a DC-DC conversion circuit having a full bridge circuit and converting DC voltage applied to a DC terminal pair of the full bridge circuit and outputting the converted voltage, a DC-AC conversion circuit converting DC voltage output from the DC-DC conversion circuit into AC voltage and outputting the converted AC voltage, a coil with one end connected to one terminal of the DC terminal pair, and a capacitor connected between another end of the coil and another terminal of the DC terminal pair, further comprising: a short-circuit control part controlling switching of the full bridge circuit so that a leg of the full bridge circuit is temporarily short-circuited; a phase reverse control part controlling switching of the full bridge circuit so that a phase of AC voltage output from the full bridge circuit is reversed, after the short-circuit control part temporarily short-circuits a leg of the full bridge circuit; and a short-circuit duration varying part varying a duration for which a leg of the full bridge circuit is short-circuited at a specific cycle according to a cycle of AC voltage output from the DC-AC conversion circuit.

(10) A controlling method according to an embodiment is a method of controlling operation of a DC-AC conversion device comprising a DC-DC conversion circuit having a full bridge circuit in which an AC terminal pair is connected to a voltage converter, converting DC voltage applied to a DC terminal pair of the full bridge circuit and outputting the converted voltage, a DC-AC conversion circuit converting DC voltage output from the DC-DC conversion circuit into AC voltage and outputting the converted AC voltage, a coil with one end connected to one terminal of the DC terminal pair, and a capacitor connected between another end of the coil and another terminal of the DC terminal pair. The method controls switching of the full bridge circuit so that a leg of the full bridge circuit is temporarily short-circuited; and controls switching of the full bridge circuit so that a phase of AC voltage output from the full bridge circuit is reversed, after a leg of the full bridge circuit is temporarily short-circuited; and varies a duration for which a leg of the full bridge circuit is short-circuited at a specific cycle according to a cycle of AC voltage output from the DC-AC conversion circuit.

(11) A control program according to an embodiment is a control program making a computer control the operation of a DC-AC conversion device comprising a DC-DC conversion circuit having a full bridge circuit in which an AC terminal pair is connected to a voltage converter, converting DC voltage applied to a DC terminal pair of the full bridge circuit and outputting the converted voltage, a DC-AC conversion circuit converting DC voltage output from the DC-DC conversion circuit into AC voltage and outputting the converted AC voltage, a coil with one end connected to one terminal of the DC terminal pair, and a capacitor connected between another end of the coil and another terminal of the DC terminal pair. The control program makes the computer function as: a short-circuit control part controlling switching of the full bridge circuit so that a leg of the full bridge circuit is temporarily short-circuited; a phase reverse control part controlling switching of the full bridge circuit so that a phase of AC voltage output from the full bridge circuit is reversed, after the short-circuit control part temporarily short-circuits a leg of the full bridge circuit; and a short-circuit duration varying part varying a duration for which a leg of the full bridge circuit is short-circuited at a specific cycle according to a cycle of AC voltage output from the DC-AC conversion circuit.

According to the present embodiment, a function similar to that of the DC-AC conversion device described above is performed.

DETAILS OF EMBODIMENTS OF THE INVENTION

The present invention will be described in detail below with reference to the drawings illustrating the embodiments thereof.

FIG. 1 is a circuit diagram illustrating a configuration example of a bidirectional DC-AC conversion device 1. The bidirectional DC-AC conversion device 1 according to the present embodiment is mounted, for example, in a plug-in hybrid vehicle and an electric vehicle, and is an insulated type performing bidirectional AC-DC conversion on alternating and direct current. The bidirectional DC-AC conversion device 1 includes a noise filter (N/F) 3, AC input/output terminals T1, T2 and DC input/output terminals T3, T4, a bidirectional DC-AC conversion circuit 4 with a power factor correction (PFC) function, a bidirectional DC-DC conversion circuit 5 and a control circuit 9 performing switching control of each conversion circuit. The bidirectional DC-DC conversion circuit 5 is constituted by, for example, a capacitor C2, a first full bridge circuit 6, a voltage converter 7 and a second full bridge circuit 8.

The AC input/output terminals T1 and T2 are connected to an AC power supply or a load in an exchangeable manner. In the case where the AC power supply is connected to the AC input/output terminals T1 and T2 while AC voltage is applied thereto, the alternating current is converted into direct current by AC-DC conversion, and the DC voltage obtained by the AC-DC conversion is output from the DC input/output terminals T3 and T4. A battery 2 is connected to the DC input/output terminals T3 and T4, and the battery 2 is charged with the direct current output from the DC input/output terminals T3 and T4. In the case where the load is connected to the AC input/output terminals T1 and T2, the DC voltage applied by the battery 2 to the DC input/output terminals T3 and T4 is converted into alternating current by AC-DC conversion, and the alternating current obtained by AC-DC conversion is fed to the load through the AC input/output terminals T1 and T2. Accordingly, the bidirectional DC-AC conversion device 1 for performing bidirectional AC-DC conversion on alternating current and direct current is mounted in a vehicle, so that the battery 2 may be utilized as a power source for disaster relief or emergency.

The noise filter 3 is connected to the AC input/output terminals T1 and T2. The noise filter 3 is a circuit which removes high-frequency noise included in the AC voltage applied to the AC input/output terminals T1 and T2, and applies the AC voltage from which noise is removed to the bidirectional DC-AC conversion circuit 4.

The bidirectional DC-AC conversion circuit 4 is a circuit for bidirectionally performing AC-DC conversion on alternating current and direct current by switching control of the full bridge circuit. The bidirectional DC-AC conversion circuit 4 includes a capacitor C1, coils L1, L2, and the first to fourth switching elements 41, 42, 43 and 44 as well as diodes 45, 46, 47 and 48 that constitute full bridge circuits. The first to fourth switching elements 41, 42, 43 and 44 are, for example, power devices of IGBT (Insulated Gate Bipolar Transistor), MOSFET (Metal-Oxide-Semiconductor Field Effect Transistor) or the like. Hereinafter, in the present embodiment, the first to fourth switching elements 41, 42, 43 and 44 will be described as IGBTs. The AC input/output terminals T1 and T2 are connected to the respective terminals of one terminal pair of the noise filter 3, while the respective terminals of the other terminal pair of the noise filter 3 is connected to the respective ends of the capacitor 1. Moreover, one terminal of this other terminal pair is connected to an end of the coil L1, while the other end of the coil L1 is connected to the emitter of the first switching element 41 and to the collector of the second switching element 42. The other terminal of the other terminal pair is connected to one end of the coil L2, while the other end of the coil L2 is connected to the emitter of the third switching element 43 and to the collector of the fourth switching element 44.

The collectors of the first and third switching elements 41 and 43 are connected to the first full bridge circuit 6. The emitters of the first and third switching elements 41 and 43 are connected to the collectors of the second and fourth switching elements 42 and 44, respectively, while the emitters of the second and fourth switching elements 42 and 44 are connected to the first full bridge circuit 6. The collectors of the first to fourth switching elements 41, 42, 43 and 44 are connected to the cathodes of the first to fourth diodes 45, 46, 47 and 48, while the anodes of the first to fourth diodes 45, 46, 47 and 48 are connected to the emitters of the first to fourth switching elements 41, 42, 43 and 44.

The collectors of the first and third switching elements 41 and 43 are connected to one end of the capacitor C2, while the other end of the capacitor C2 is connected to the emitters of the second and fourth switching elements 42 and 44.

The first full bridge circuit 6 is a circuit for bidirectionally performing AC-DC conversion on alternating current and direct current by switching control of the first full bridge circuit 6. The first full bridge circuit 6 includes the first to fourth switching elements 61, 62, 63 and 64 as well as diodes 65, 66, 67 and 68 that constitute the first full bridge circuit. The collectors of the first and third switching elements 61 and 63 are connected to the collectors of the first and third switching elements 41 and 43. The emitters of the first and third switching elements 61 and 63 are connected to the collectors of the second and fourth switching elements 62 and 64, respectively, while the emitters of the second and fourth switching elements 62 and 64 are connected to the second and fourth switching elements 42 and 44. The collectors of the first to fourth switching elements 61, 62, 63 and 64 are connected to the cathodes of the diodes 65, 66, 67 and 68, while the anodes of the diodes 65, 66, 67 and 68 are connected to the emitters of the first to fourth switching elements 61, 62, 63 and 64.

The voltage converter 7 includes a plurality of magnetically-coupled coils including, for example, the first coil and the second coil. The terminals of the terminal pair of the first coil are connected to the emitters of the first switching element 61 and the third switching element 63. When the AC voltage output from the first full bridge circuit 6 is applied to the first coil, an alternating magnetic flux is generated at the first coil, and the converted AC voltage occurs at the second coil due to the alternating magnetic flux.

The second full bridge circuit 8 is a circuit for bidirectionally performing AC-DC conversion on alternating current and direct current by switching control of the second full bridge circuit 8. The second full bridge circuit 8 includes a capacitor C3, a coil L3, and the first to fourth switching elements 81, 82, 83 and 84 as well as diodes 85, 86, 87 and 88 constituting the second full bridge circuit 8. One end of the second coil constituting the voltage converter 7 is connected to the emitter of the first switching element 81 and the collector of the second switching element 82, and the other end of the second coil is connected to the emitter of the third switching element 83 and to the collector of the fourth switching element 84.

The collectors of the first and third switching elements 81 and 83 correspond to one terminal 80a of the DC terminal pair of the second full bridge circuit 8, and the one terminal 80a is connected to one end of the coil L3, while the other end of the coil L3 is connected to the DC input/output terminal T3. The emitters of the first and third switching elements 81 and 83 are connected to the collectors of the second and fourth switching elements 82 and 84, respectively. The emitters of the second and fourth switching elements 82 and 84 correspond to the other terminal 80b in the DC terminal pair in the second full bridge circuit 8, the other terminal 80b being connected to the DC input/output terminal T4. The collectors of the first to fourth switching elements 81, 82, 83 and 84 are connected to the cathodes of the diodes 85, 86, 87 and 88, while the anodes of the diodes 85, 86, 87 and 88 are connected to the emitters of the switching elements 81, 82, 83 and 84. Moreover, one terminal 80a of the second full bridge circuit 8 is connected to one end of the capacitor C3, while the other end of the capacitor C3 is connected to the other terminal 80b of the second full bridge circuit 8.

The capacitor C3 is an element for smoothing DC voltage output from the second full bridge circuit 8. The capacitor C3 functions as a decoupling capacitor at the time of DC-AC conversion. The coil L3 is an element which suppresses the ripple current caused by switching of the first to fourth switching elements 81, 82, 83 and 84 flowing into the capacitor C3, to prevent the capacitor C3 from being damaged.

Furthermore, the bidirectional DC-AC conversion device 1 includes an AC voltage detection part 90a for detecting AC voltage to be input to or output from the bidirectional DC-AC conversion circuit 4. The AC voltage detection part 90a is located on a conductive wire connecting the AC input/output terminal T2 and one terminal of one terminal pair included in the noise filter 3, and serves to output a signal corresponding to the voltage of the conductive wire, i.e. AC voltage applied to the bidirectional DC-AC conversion circuit 4, to the control circuit 9. For example, the AC voltage detection part 90a is a circuit including a rectifier circuit connected to the conductive wire as well as a voltage divider resistance which divides the DC voltage rectified at the rectifier circuit, and outputting the divided voltage to the control circuit 9. It is to be noted that the divided voltage may be amplified by the amplifier and output to the control circuit 9, or the voltage may be converted by A-D conversion and the converted voltage value may be output to the control circuit 9.

Moreover, the bidirectional DC-AC conversion device 1 includes an AC current detection part 90b detecting current to be input to and output from the bidirectional DC-AC conversion circuit 4. The AC current detection part 90b is located on the conductive wire connecting the coil L2 and one terminal of the other terminal pair included in the noise filter 3, and serves to output a signal corresponding to the current to be input to or output from the bidirectional DC-AC conversion circuit 4 to the control circuit 9. The AC current detection part 90b is a circuit which includes, for example, a current transformer, converts the current transformed by the current transformer into voltage and outputs the voltage to the control circuit 9.

In addition, the bidirectional DC-AC conversion device 1 includes a DC current detection part 90c detecting current to be input to or output from the battery 2. The DC current detection part 90c is located on the conductive wire connecting the other terminal 80b of the second full bridge circuit 8 and the DC input/output terminal T4, and serves to output a signal corresponding to the current to be input to or output from the battery 2 to the control circuit 9.

Figure 2:
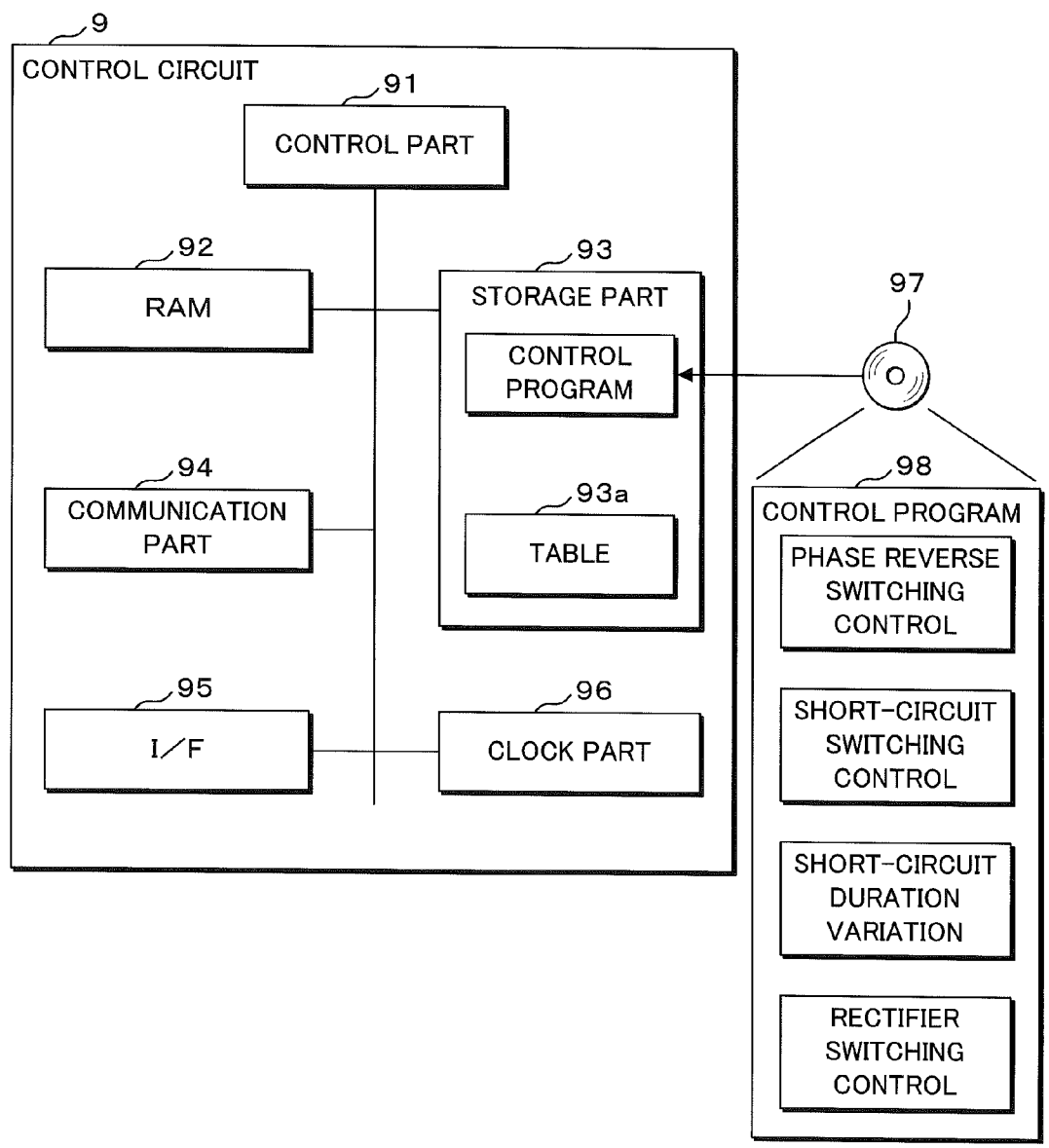
FIG. 2 is a block diagram illustrating a configuration example of a control circuit.

FIG. 2 is a block diagram illustrating a configuration example of the control circuit 9. The control circuit 9 includes a control unit 91 such as a CPU (Central Processing Unit) controlling the operation of each configuration part of the control circuit 9. The control unit 91 is connected, via a bus, to an RAM 92, a storage part 93, a communication part 94, an interface 95, and a clock part 96 for measuring the timing of switching control.

The storage part 93 is a non-volatile memory such as an EEPROM (Electrically Erasable Programmable ROM), and stores a control program 98 for performing switching control according to the present embodiment, a predetermined duration and a table 93a. The table 93a stores therein electric power supplied from the bidirectional DC-AC conversion circuit 4 and variation amplitude of short-circuit duration, which will be described later, in association with each other. The content in the storage part 93 may be erased therefrom or may be written therein, and the predetermined duration may also be changed as necessary.

Moreover, the control program 98 may be recorded in a recording medium 97, which is a computer-readable portable medium, such as a CD (Compact Disc)-ROM, DVD (Digital Versatile Disc)-ROM, BD (Blu-ray (registered trademark) Disc), hard-disk drive or solid state drive. The control unit 91 may read out the control program 98 from the recording medium 97 and may store the read-out control program 98 in the storage part 93.

Furthermore, the control program 98 according to the present invention may also be obtained via the communication part 94 from an external computer (not illustrated) connected to a communication network and may be stored in the storage part 93.

The RAM 92 is a memory such as a DRAM (Dynamic RAM) or an SRAM (Static RAM), which temporarily stores the control program 98 as well as predetermined duration that are read out from the storage part 93 when arithmetic processing of the control unit 91 is executed, and also various kinds of data generated in the arithmetic processing of the control unit 91.

The communication part 94 is a circuit receiving a charging instruction for instructing to convert AC voltage into DC voltage, a discharging instruction for instructing to convert DC voltage into AC voltage, a terminating instruction and the like.

The interface 95 is connected to the gates of the first to fourth switching elements 41, . . . , 44, 61, . . . , 64, 81, . . . , 84 that constitute the bidirectional DC-AC conversion circuit 4 as well as the first and second bidirectional conversion circuits 6 and 8, and voltage is applied to the gates to perform switching control of each circuit.

Moreover, the interface 95 is connected to the AC voltage detection part 90a, AC current detection part 90b and DC current detection part 90c, and the current as well as voltage detected at each of the detection parts are input to the interface 95.

In the case where the control unit 91 receives a charging instruction at the communication part 94, switching control is performed so as to make the bidirectional DC-AC conversion circuit 4 operate as a power factor improvement circuit and an AC-DC conversion circuit, to make the first full bridge circuit 6 as a DC-AC conversion circuit, and to make the second full bridge circuit 8 as an AC-DC conversion circuit. Moreover, in the case where the control unit 91 receives a discharging instruction at the communication part 94, switching control is performed so as to make the second full bridge circuit 8 as a DC-AC conversion circuit, to make the first full bridge circuit 6 as an AC-DC conversion circuit, and to make the bidirectional DC-AC conversion circuit 4 as a DC-AC conversion circuit.

Figure 3:
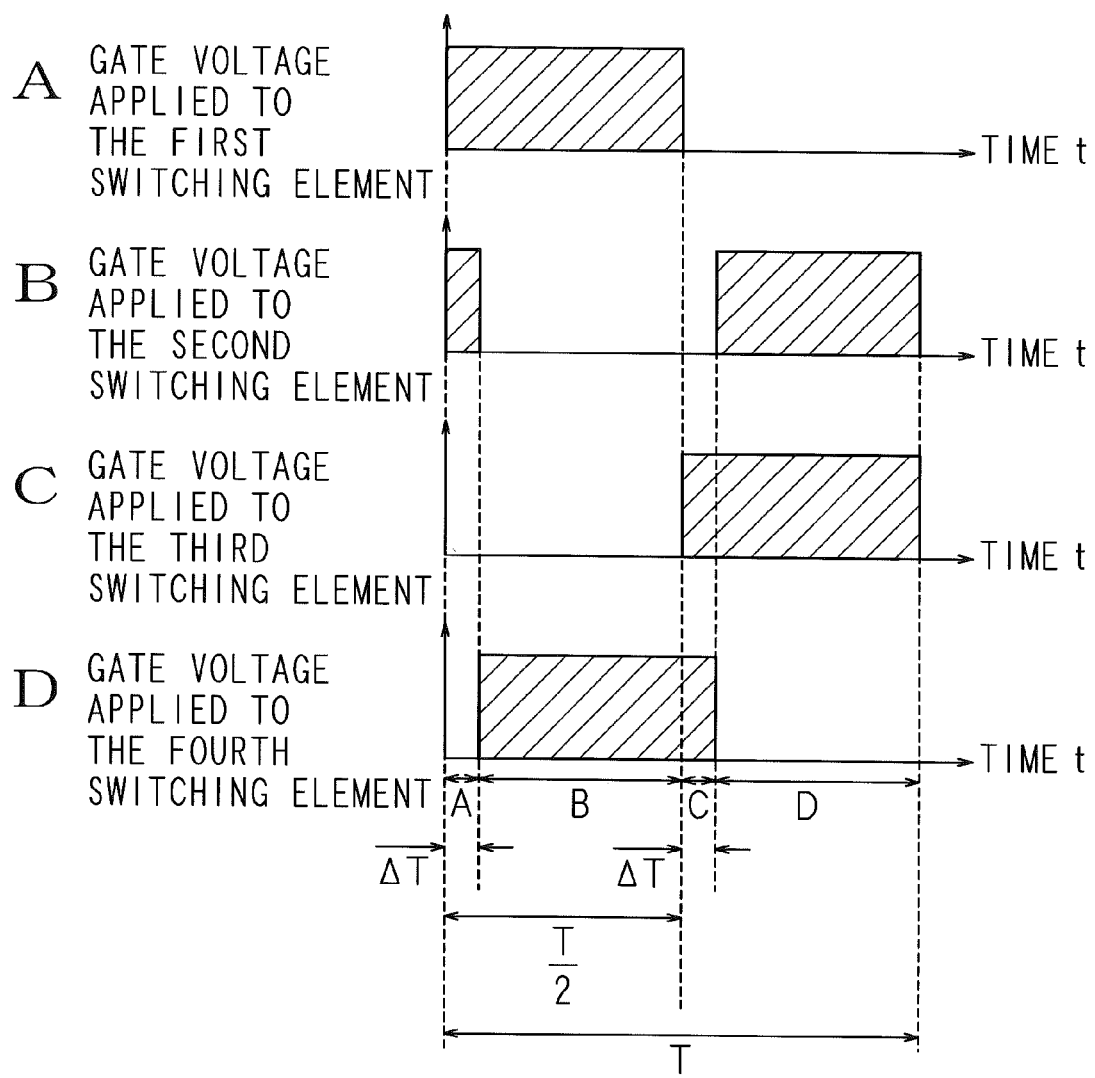
FIG. 3 is a timing chart illustrating a method of switching control.
Figure 4:
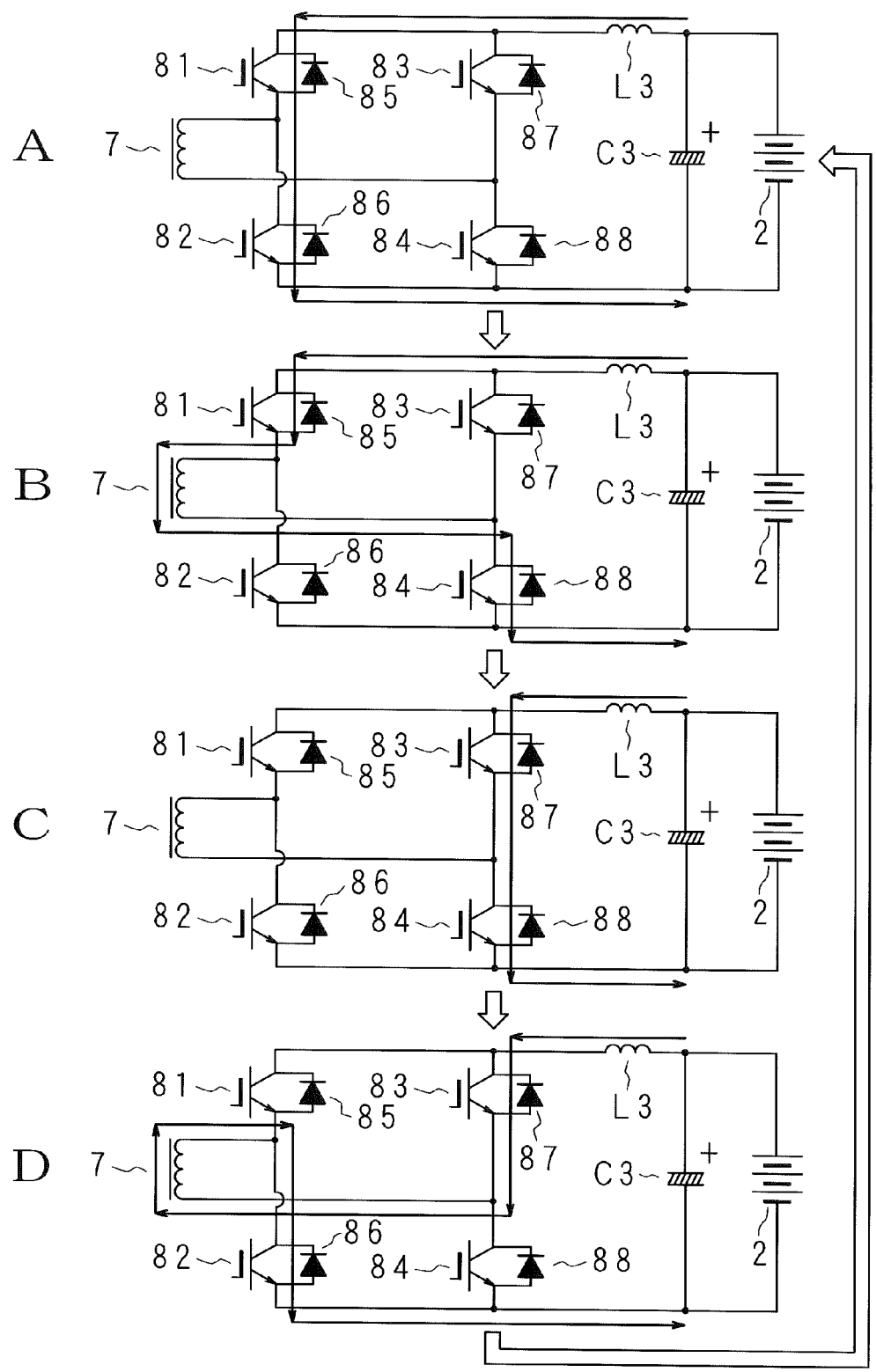
FIG. 4 is an explanatory view illustrating an operation example of the second full bridge circuit.
Figure 5:
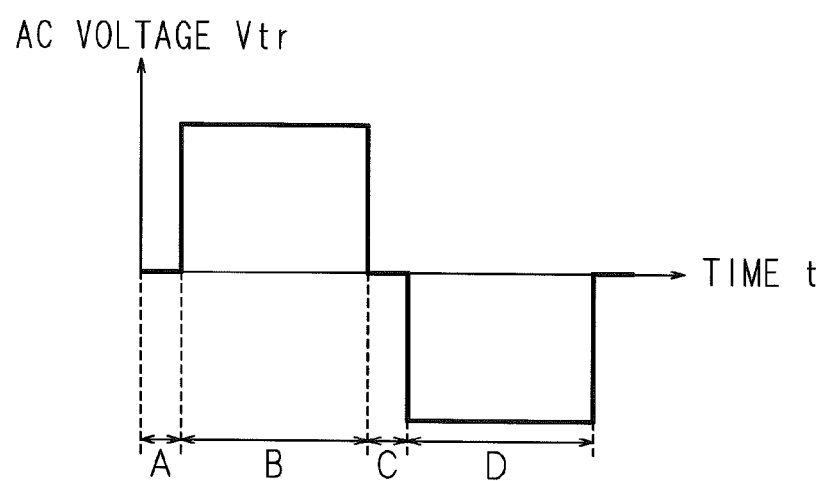
FIG. 5 is a timing chart illustrating AC voltage applied to a voltage converter.

FIG. 3 is a timing chart illustrating a method of switching control, FIG. 4 is an explanatory view illustrating an operation example of the second full bridge circuit 8, and FIG. 5 is a timing chart illustrating AC voltage applied to the voltage converter 7. The horizontal axis in each of FIGS. 3 and 5 indicates time t, the vertical axis in FIG. 3 indicates gate voltage applied to the first to fourth switching elements 81, 82, 83 and 84, and the vertical axis in FIG. 5 indicates AC voltage Vtr applied to the voltage converter 7. Here, the operation of the second full bridge circuit 8 at the time of discharge, which is a feature of the present invention, is particularly described. In the case where the phase of the AC voltage to be output from the second full bridge circuit 8 to the voltage converter 7 is reversed as illustrated in FIGS. 3 and 4, switching of the second full bridge circuit 8 is so controlled that the second full bridge circuit 8 is temporarily short-circuited. For example, prior to the mutual switching between an energized state where the first and fourth switching elements 81 and 84 are in the ON state while the second and third switching elements 82 and 83 are in the OFF state, and an energized state where the first and fourth switching elements 81 and 84 are in the OFF state while the second and third switching elements 82 and 83 are in the ON state, the control circuit 9 temporarily switches the first and second switching elements 81 and 82 to be in the ON state (or OFF state) and switches the third and fourth switching elements 83 and 84 to be in the OFF state (or ON state).

This will be described below in more detail. It is defined here that the time is t, the cycle for ON/OFF of the first switching element 81 is T, and the time period for which the second full bridge circuit 8 is short-circuited is a short-circuit duration $\Delta T$. The cycle T is 20 μsec, for example. The short-circuit duration $\Delta T$ is approximately 1 μsec, which is a periodically-varying duration of time, as will be described later. First, the control circuit 9 switches the first and second switching elements 81 and 82 to be in the ON state while short-circuiting the second full-bridge circuit 8 for a period of the short-circuit duration $\Delta T$, as illustrated in FIGS. 3A, 3B and 4A. By short-circuiting the second full-bridge circuit 8, energy may be accumulated in the coil L3. In the short-circuited state, the AC voltage Vtr output from the voltage converter 7 is approximately 0V as illustrated in FIG. 5. Subsequently, in the case where the short-circuit duration $\Delta T$ has elapsed since the first switching element 81 is switched to be in the ON state, the control circuit 9 switches the second switching element 82 to the OFF state as illustrated in FIGS. 3B to 3D and switches the fourth switching element 84 to the ON state. This switching makes the first and fourth switching elements 81 and 84 be in the ON state while making the second and third switching elements be in the OFF state as illustrated in FIG. 4B. Current flows in the second coil of the voltage converter 7, and positive voltage is output as illustrated in FIG. 5. When switched to such an energized state, the energy accumulated in the coil L3 is discharged, and the AC voltage output from the voltage converter 7 is thus raised.

In the case where half a cycle T/2 has elapsed since the first switching element 81 is switched to be in the ON state, the control circuit 9 switches the first switching element 81 to be in the OFF state as illustrated in FIGS. 3C and 4C while switching the third switching element 83 to be in the ON state, to short-circuit the second full bridge circuit 8. The second full bridge circuit 8 is short-circuited so that energy may be accumulated in the coil L3.

Subsequently, in the case where ($\Delta T+T/2$) has elapsed since the first switching element 81 is switched to be in the ON state, the control circuit 9 switches the second switching element 82 to the ON state as illustrated in FIGS. 3B and 3D, while switching the fourth switching element 84 to the OFF state. Such switching allows the second and third switching elements 82 and 83 to be in the ON state and allows the first and fourth switching elements 81 and 84 to be in the OFF state, as illustrated in FIG. 4D. Current flows in the second coil of the voltage converter 7, and negative voltage is output as illustrated in FIG. 5. The direction of current as illustrated in FIG. 4D is opposite to the direction of current as illustrated in FIG. 4B. When switched to such an energization state, the energy accumulated in the coil L3 is discharged, and the AC voltage output from the voltage converter 7 is thus raised.

In the case where the cycle T has elapsed since the first switching element 81 is switched to be in the ON state, the control circuit 9 switches the first switching element 81 to the ON state while switching the third switching element 83 to the OFF state as illustrated in FIGS. 3C and 4A, to short-circuit the second full bridge circuit 8. Likewise, by switching control of the second full bridge circuit 8, the raised AC voltage may be output to the voltage converter 7.

Details of the switching procedure between the short-circuited state as illustrated in FIGS. 4A and 4C, and the energized state in which the phase of the AC voltage to be output is reversed will now be described. The control circuit 9 performs switching control, when switching is performed between the short-circuited state and the energized state, so that either one of the first and third switching elements 81 and 83 as well as either one of the second and fourth switching elements 82 and 84 are constantly in the ON state.

Figure 6:
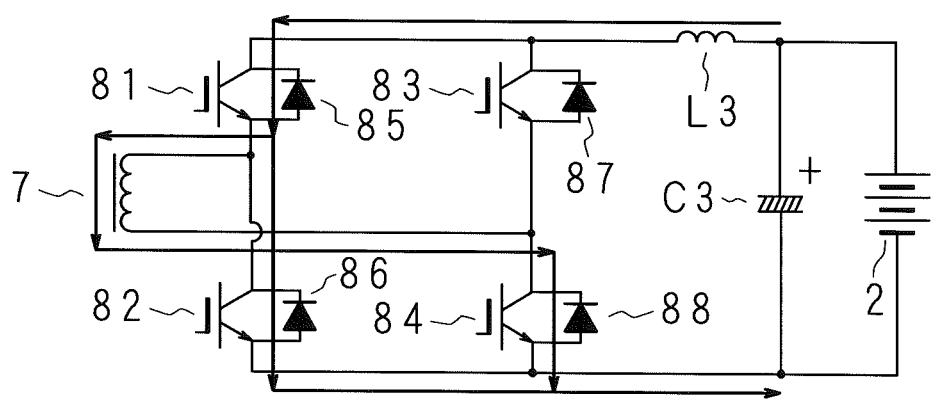
FIG. 6 is an operation explanatory view illustrating a method of switching from a short-circuited state to a state where a phase of AC voltage is reversed.

FIG. 6 is an operation explanatory view illustrating a method of switching from the short-circuited state to a state where the phase of AC voltage is reversed. For example, in the case where the state is switched from the short-circuited state as illustrated in FIG. 4A to the energized state as illustrated in FIG. 4B, the control circuit 9 first switches the fourth switching element 84 to be in the ON state as illustrated in FIG. 6, and then performs switching control so that the second switching element 82 is in the OFF state. Switching is performed similarly for the other short-circuited states and energized states by first performing ON control and then OFF control so as not to close the second full bridge circuit 8.

Next, variation control for the short-circuit duration ΔT is described.

Figure 7:
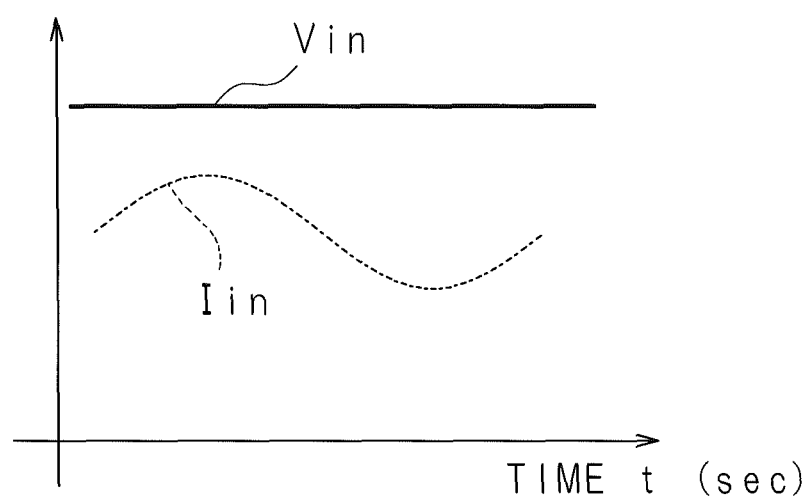
FIG. 7 is a waveform illustrating ripple current output from a battery.

FIG. 7 is a waveform illustrating ripple current. The horizontal axis indicates time, whereas the vertical axis indicates voltage or current. Voltage Vin output from the battery 2 is direct current and constant voltage. In the case where the load connected to the AC input/output terminals T1 and T2 is small, the output current Iin will also be constant current, whereas in the case where the load is large, ripple current is generated as illustrated in FIG. 7. The ripple current output from the battery 2 causes the power factor to be lowered and the battery life to be shortened.

Thus, the control circuit 9 varies the short-circuit duration ΔT of the second full bridge circuit 8 at a specific cycle according to the cycle of the AC voltage output from the bidirectional DC-AC conversion circuit 4, and performs control so as to reduce the ripple current. For example, the control circuit 9 varies the short-circuit duration ΔT at a cycle approximately twice as long as the cycle of the AC voltage output from the bidirectional DC-AC conversion circuit 4. Note that the cycle of approximately twice is an example, and the short-circuit duration ΔT may be varied at a cycle of another frequency, e.g. a cycle of an even multiple of the AC voltage, if the ripple current can be reduced. Moreover, the short-circuit duration ΔT may also be varied at a cycle with a long short-circuit duration on average at the time when load current increases and a short short-circuit duration on average at the time when load current decreases. In the case where the cycle of the AC voltage output from the bidirectional DC-AC conversion circuit 4 corresponds to 60 Hz, the short-circuit duration ΔT is varied at 120 Hz.

Figure 8:
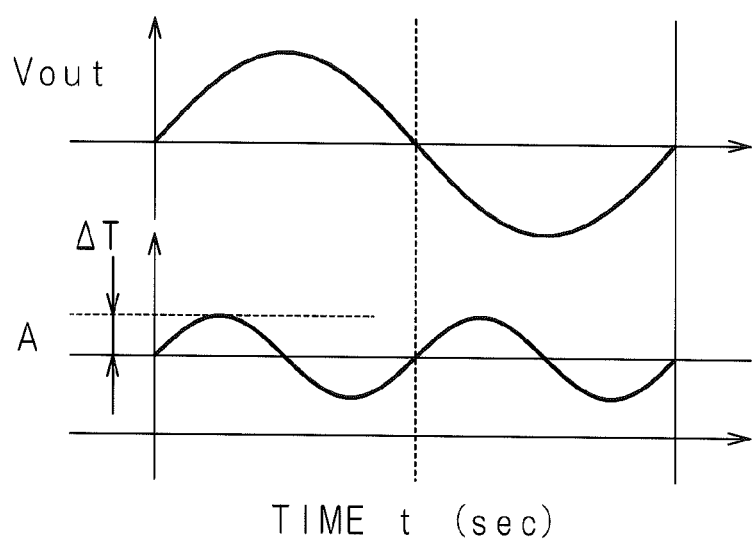
FIG. 8 is a graph illustrating the variation in a short-circuit duration.

FIG. 8 is a graph illustrating the variation in the short-circuit duration. The horizontal axis indicates time. The vertical axis in the upper part of the graph indicates the AC voltage Vout to be output from the bidirectional DC-AC conversion circuit 4, whereas the vertical axis in the lower part of the graph indicates variation in the short-circuit duration ΔT. The short-circuit duration ΔT of a leg in the second full bridge circuit 8 is represented by the equation (1) below. Note that the equation (1) is the same as the mathematical representation previously illustrated in Description of Embodiments of the Invention.

$$\Delta T = \Delta T_0 + A \cdot \sin(4\pi ft) \quad (1)$$

wherein

ΔT: duration for which a leg in the second full bridge circuit 8 is short-circuited $\Delta T_0$: predetermined duration A: variation amplitude of duration Δt F: frequency of AC voltage output from the bidirectional DC-AC conversion circuit 4 t: time

The control circuit 9 synchronizes the zero cross point of the AC voltage output from the bidirectional DC-AC conversion circuit 4 with the timing at which the rate of change in the amount of variation of the short-circuit duration of the second full bridge circuit 8 is at a maximum. That is, the control circuit 9 controls the phase of the short-circuit duration ΔT such that 4πft will be 2π·N (wherein N is an integer) at the zero cross point of the AC voltage.

Moreover, the control circuit 9 controls the decreased amount of ripple current by changing the variation amplitude A of the short-circuit duration ΔT of the second full bridge circuit 8 depending on the magnitude of the ripple current.

Figure 9:
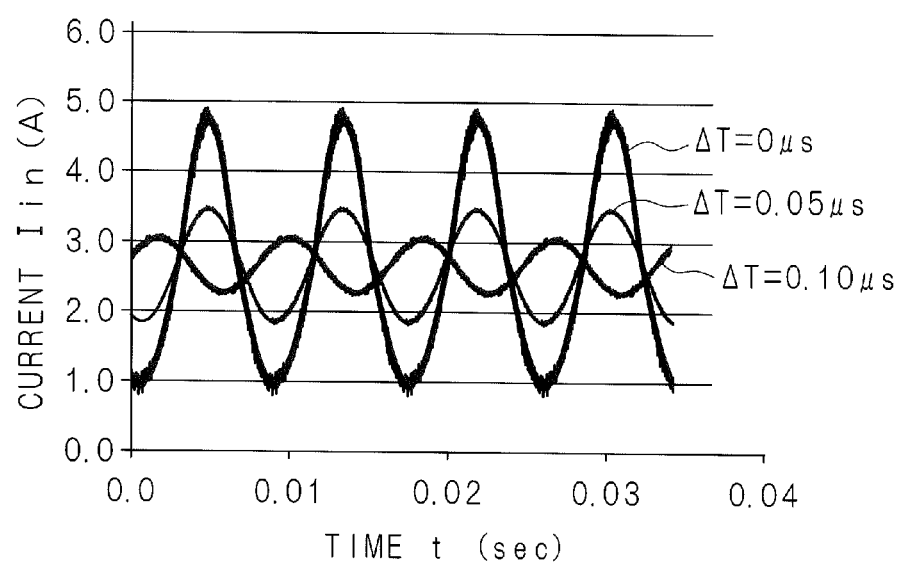
FIG. 9 is a waveform illustrating the change of ripple current by variation in a short-circuit duration.

FIG. 9 is a waveform illustrating the change of ripple current by variation in the short-circuit duration. The horizontal axis indicates time whereas the vertical axis indicates current Iin. The current Iin is current to be input to the second full bridge circuit 8 from the battery 2. In the case where the variation amplitude A of the short-circuit duration ΔT is 0 μs, ripple current with the current variation range of approximately 1.0 A to 5.0 A is generated. In the case where the variation amplitude A of the short-circuit duration ΔT is increased to 0.05 μs, the current variation range is lowered to approximately 1.8 A to 3.4 A. Furthermore, in the case where the variation amplitude A of the short-circuit duration ΔT is greatly increased to 0.10 μs, the phase of the ripple current is opposite to the phase of the ripple current when the short-circuit duration ΔT is 0-0.05 μs. This is because the variation amplitude A is too long, and the ripple current may be reduced by adjusting the variation amplitude A of the short-circuit duration ΔT to be approximately 0.07-0.08.

The processing procedure of the control circuit 9 operating based on the control program 98 for implementing the control method as described above will specifically be described.

Figure 10:
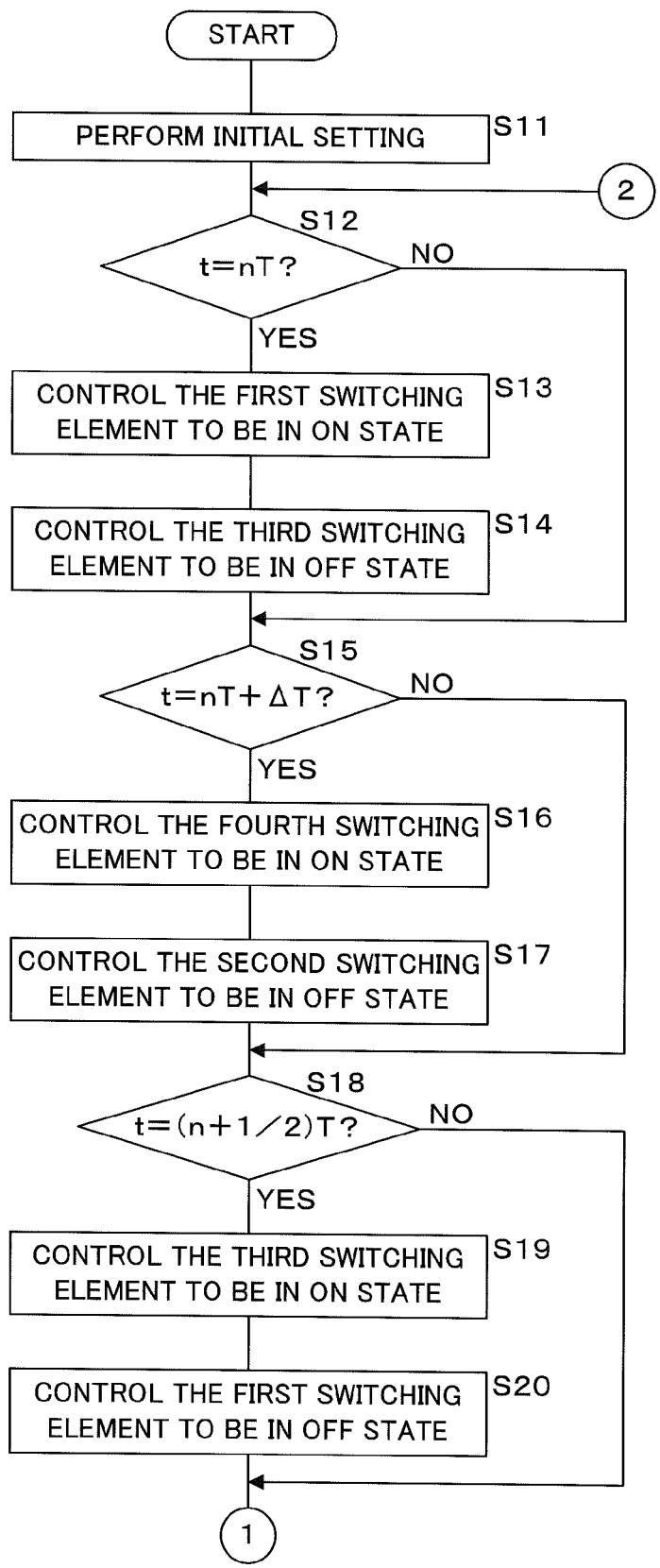
FIG. 10 is a flowchart illustrating a processing procedure performed by a control unit concerning switching control.
Figure 11:
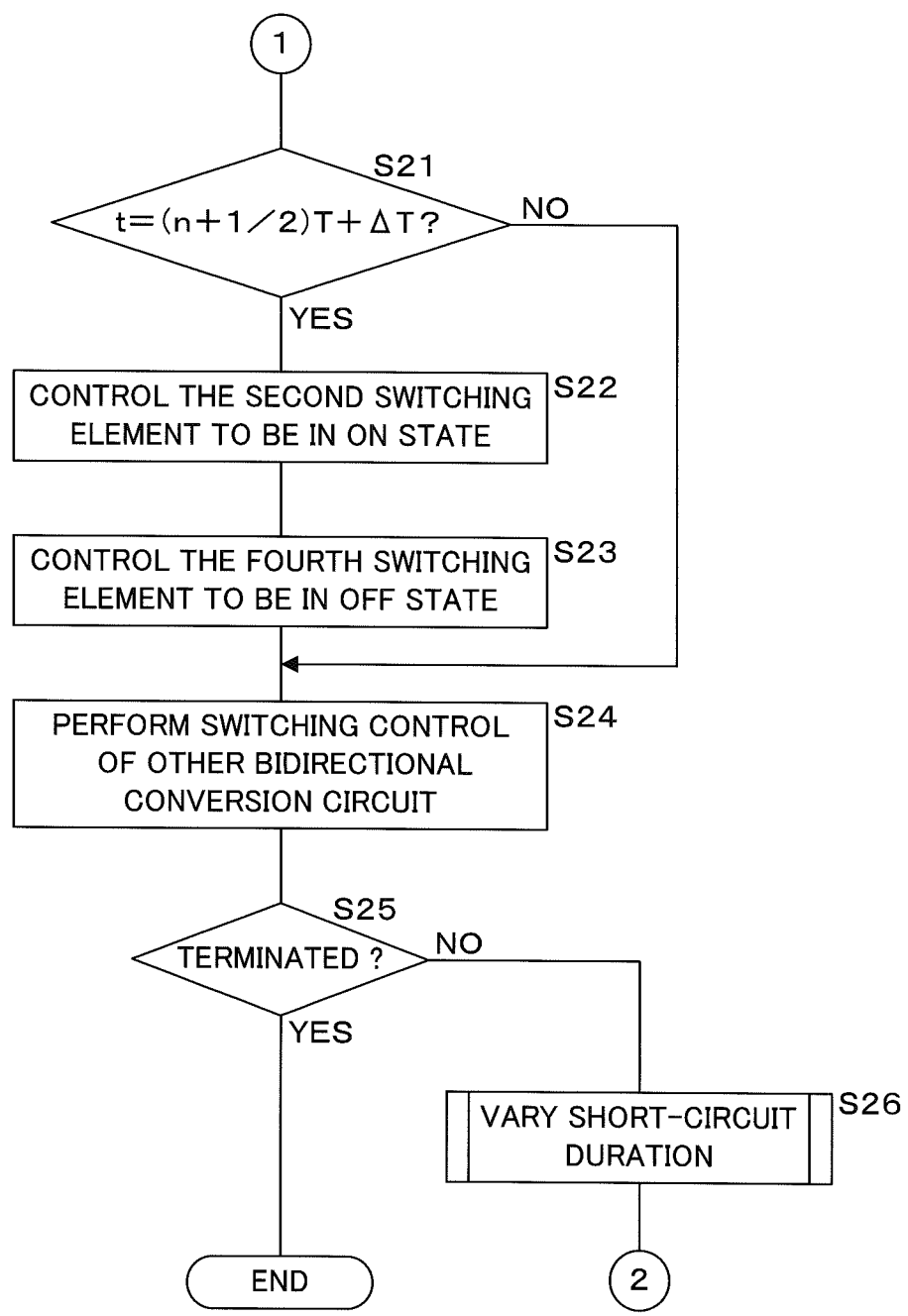
FIG. 11 is a flowchart illustrating a processing procedure performed by a control unit concerning switching control.

FIGS. 10 and 11 show a flowchart illustrating a processing procedure performed by a control unit 91 concerning switching control. The control unit 91 reads out the control program 98 and the predetermined duration $\Delta T_0$ as the short-circuit duration ΔT from the storage part 93 to the RAM 92, and performs various kinds of initial setting (step S11). As an initial state, the first and second switching elements 81 and 82 may be switched to be in the ON state as illustrated in FIG. 4A, and then the subsequent processing may be executed.

Subsequently, the control unit 91 determines whether or not the current time t is nT (step S12). Here, n is an integer. If it is determined that the time t is nT (step S12: YES), the control unit 91 controls the first switching element 81 to be in the ON state (step S13), and controls the third switching element 83 to be in the OFF state (step S14).

If the processing at S14 is terminated, or if it is determined at step S12 that the time t is not nT (step S12: NO), the control unit 91 determines whether or not the time t is nT+ΔT (step S15). If it is determined that the time t is nT+ΔT (step S15: YES), the control unit 91 controls the fourth switching element 84 to be in the ON state (step S16), and controls the second switching element 82 to be in the OFF state (step S17).

If the processing at step S17 is terminated, or if it is determined at step S15 that the time t is not nT+ΔT, (step S15: NO), the control unit 91 determines whether or not the time t is (n+½)T (step S18). If it is determined that the time t is (n+½)T (step S18 YES), the control unit 91 controls the third switching element 83 to be in the ON state (step S19), and controls the first switching element 81 to be in the OFF state (step S20).

If the processing at step S20 is terminated, or if it is determined at step S18 that the time t is not (n+½)T (step S18: NO), the control unit 91 determines whether or not the time t is (n+½)T+ΔT (step S21). If it is determined that the time t is (n+½)T+ΔT (step S21: YES), the control unit 91 controls the second switching element 82 to be in the ON state (step S22), and controls the fourth switching element 84 to be in the OFF state (step S23).

If the processing at step S23 is terminated, or if it is determined at step S21 that the time t is not (n+½)T+ΔT (step S21: NO), the control unit 91 performs switching control of the bidirectional DC-AC conversion circuit 4 and the first full bridge circuit 6 (step S24). More specifically, the control circuit 9 controls the first and fourth switching elements 61 and 64 in the first full bridge circuit 6 to be in the ON state and controls the second and third switching elements 62 and 63 to be in the OFF state for a period in which positive voltage is being applied to the emitter of the switching element 61, and controls the first and fourth switching elements 61 and 64 to be in the OFF state and controls the second and third switching elements 62 and 63 to be in the ON state for a period in which negative voltage is being applied to the emitter of the third switching element 63. Moreover, the control circuit 9 alternately switches the state between the energized state where the first and fourth switching elements 61 and 64 of the bidirectional DC-AC conversion circuit 4 are switched to be in the ON state while the second and third switching elements 62 and 63 are switched to be in the OFF state, and the energized state where the first and fourth switching elements 61 and 64 are switched to be in the OFF state while the second and third switching elements 62 and 63 are switched to be in the ON state, to convert the DC voltage into the AC voltage by DC-AC conversion.

Subsequently, the control unit 91 determines whether or not the AC-DC conversion control is terminated (step S25). The control unit 91 terminates the AC-DC conversion control in the case where a terminating instruction is received by the communication part 94. If it is determined to terminate (step S25: YES), the control unit 91 terminates the processing. If it is determined not to terminate (step S25: NO), the control unit 91 varies the short-circuit duration ΔT (step S26), returns the processing to step S12, and continuously executes the switching control as described above.

Figure 12:
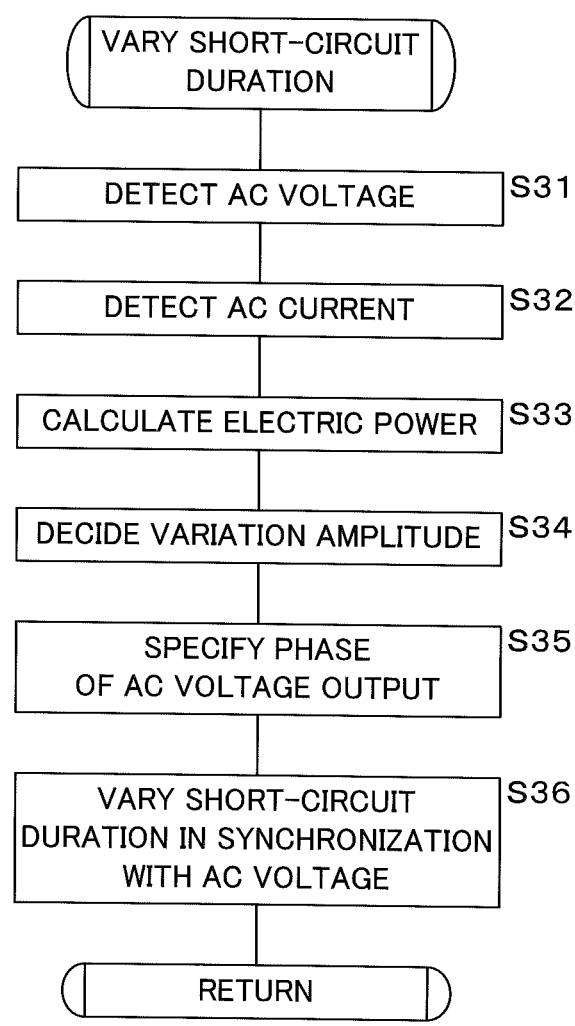
FIG. 12 is a flowchart illustrating a processing procedure performed by a control unit concerning variation of short-circuit duration.

FIG. 12 is a flowchart illustrating a processing procedure performed by the control unit 91 concerning variation of a short-circuit duration. The control unit 91 detects the AC voltage output from the bidirectional AC-DC conversion circuit at the AC voltage detection part 90a (step S31). Moreover, the control unit 91 detects the AC current output from the bidirectional AC-DC conversion circuit by the AC current detection part 90b (step S32). The control unit 91 then calculates the electric power supplied from the bidirectional AC-DC conversion circuit (step S33). Subsequently, the control unit 91 decides, based on the table 93a stored in the storage part 93 and the electric power calculated at step S33, the variation amplitude A of the short-circuit duration ΔT corresponding to the electric power (step S34).

Subsequently, the control unit 91 specifies the phase of the AC voltage output from the bidirectional AC-DC conversion circuit (step S35). The control unit 91 then varies the short-circuit duration ΔT in synchronization with the AC voltage (step S36), and terminates the processing concerning the variation in the short-circuit duration ΔT. That is, as illustrated in FIG. 8, the zero cross point of the AC voltage detected by the voltage detection part is synchronized with the timing at which the rate of change in the amount of variation in the short-circuit duration ΔT for which the second full bridge circuit 8 is short-circuited is at a maximum, to calculate the value of the short-circuit duration ΔT with the equation (1) described above.

Figure 13:
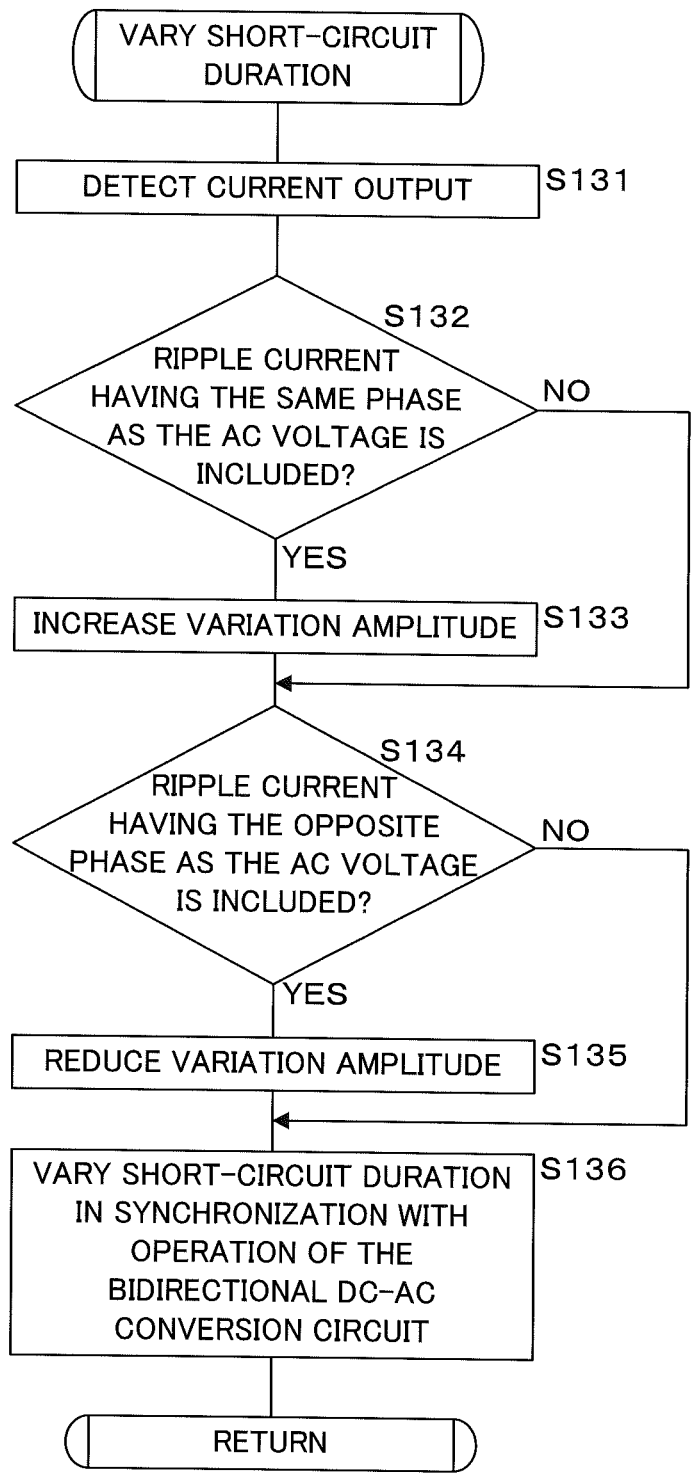
FIG. 13 is a flowchart illustrating another processing procedure performed by a control unit concerning variation of short-circuit duration.

FIG. 13 is a flowchart illustrating another processing procedure performed by the control unit 91 concerning variation in the short-circuit duration. The control unit 91 detects the current output from the battery 2 at the DC current detection part 90c (step S131). Subsequently, the control unit 91 determines whether or not the ripple current having the same phase as the AC voltage output from the bidirectional AC-DC conversion circuit is included in the current detected at step S131 (step S132). If it is determined that the ripple current having the same phase is included (step S132: YES), the control unit 91 increases the variation amplitude A of the short-circuit duration ΔT (step S133).

If the processing at step S133 is terminated, or if it is determined that the ripple current of the same phase is not included (step S132: NO), the control unit 91 determines whether or not the ripple current of the opposite phase is included in the current detected at step S131 (step S134). If it is determined that the ripple current of the opposite phase is included (step S134: YES), the control unit 91 reduces the variation amplitude A of the short-circuit duration ΔT (step S135). If the processing at step S135 is terminated, or if it is determined that the ripple current of the opposite phase is not included (step S134: NO), the control unit 91 varies the short-circuit duration ΔT in synchronization with the operation of the bidirectional DC-AC conversion circuit 4 (step S136), and terminates the processing concerning the variation in the short-circuit duration. At step S136, the control unit 91 synchronizes the timing at which the phase of the AC voltage output from the bidirectional DC-AC conversion circuit 4 is reversed with the timing at which the rate of change for the amount of variation in the duration for which a leg of the second full bridge circuit 8 is short-circuited is at a maximum. That is, the control unit 91 synchronizes the timing of switching the bidirectional DC-AC conversion circuit 4 and the timing at which the rate of change for the amount of variation in the duration for which the leg of the full bridge circuit 8 is short-circuited is at a maximum.

As described above, by varying the short-circuit duration ΔT, the ripple current output from the battery 2 may be reduced.

Meanwhile, the control method for the second full bridge circuit 8 as described in FIGS. 10 and 11 is a mere example, and the second full bridge circuit 8 may also be short-circuited with another procedure if the switching of the second full bridge circuit 8 is so controlled as to temporarily short-circuit the second full bridge circuit 8 when the phase of the output AC voltage is reversed.

Figure 14:
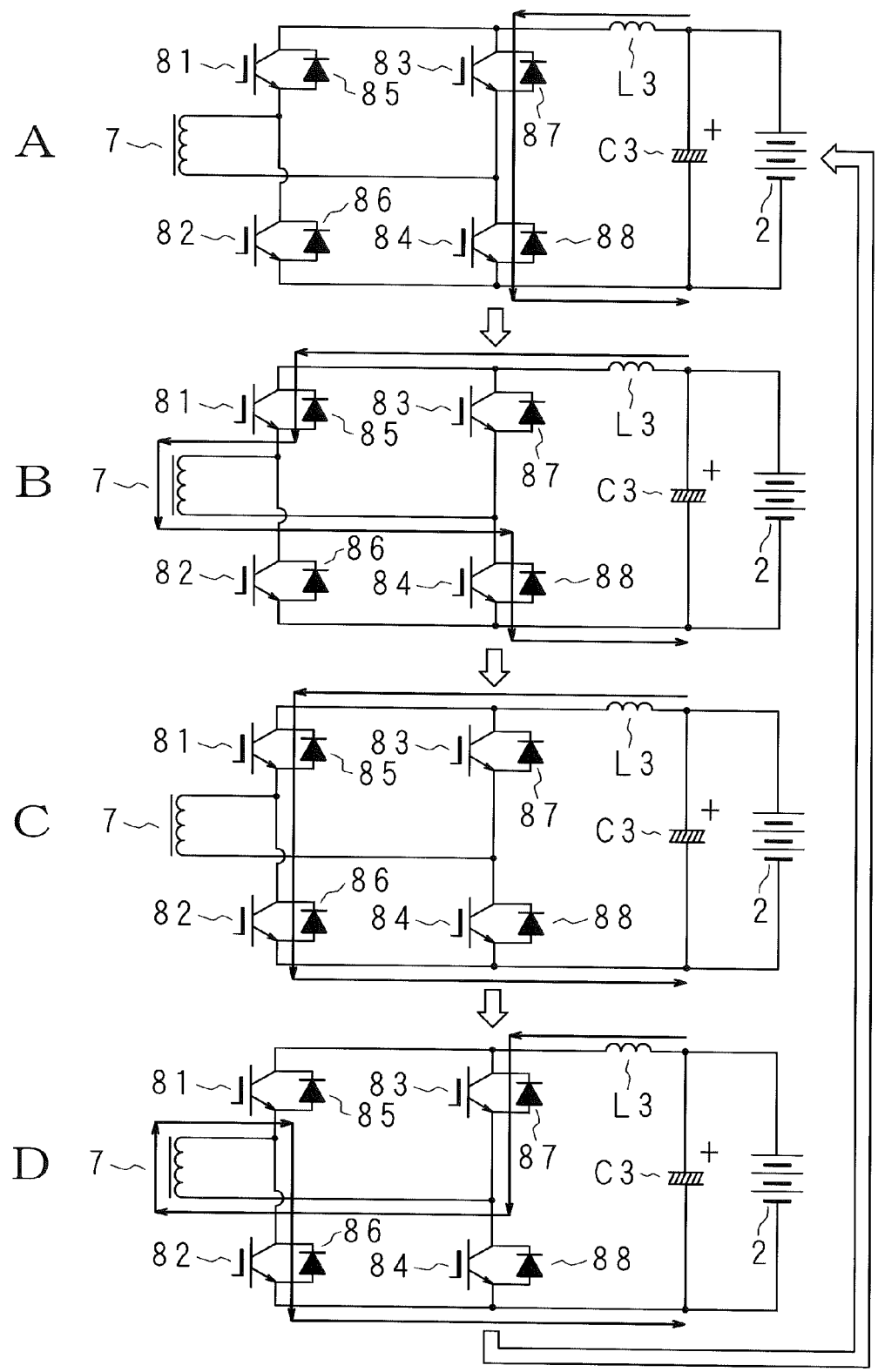
FIG. 14 is an explanatory view illustrating another operation example of the second full bridge circuit.

FIG. 14 is an explanatory view illustrating another operation example of the second full bridge circuit 8. For example, as illustrated in FIGS. 14B to 14D, prior to the switching from an energized state where the first and fourth switching elements 81 and 84 are in the ON state while the second and third switching elements 82 and 83 are in the OFF state, to an energized state where the first and fourth switching elements 81 and 84 are in the OFF state while the second and third switching elements 82 and 83 are in the ON state, temporarily, the first and second switching elements 81 and 82 are switched to be in the ON state while the third and fourth switching elements 83 and 84 are switched to be in the OFF state. Moreover, as illustrated in FIGS. 14D to 14B, prior to the switching from an energized state where the first and fourth switching elements 81 and 84 are in the OFF state while the second and third switching elements 82 and 83 are in the ON state, to an energized state where the first and fourth switching elements 81 and 84 are in the ON state while the second and third switching elements 82 and 83 are in the OFF state, temporarily, the first and second switching elements 81 and 82 are switched to be in the OFF state while the third and fourth switching elements 83 and 84 are switched to be in the ON state.

By the switching control as described above, a functional effect similar to that in the switching control described with reference to FIGS. 10 and 11 may be obtained.

Figure 15:
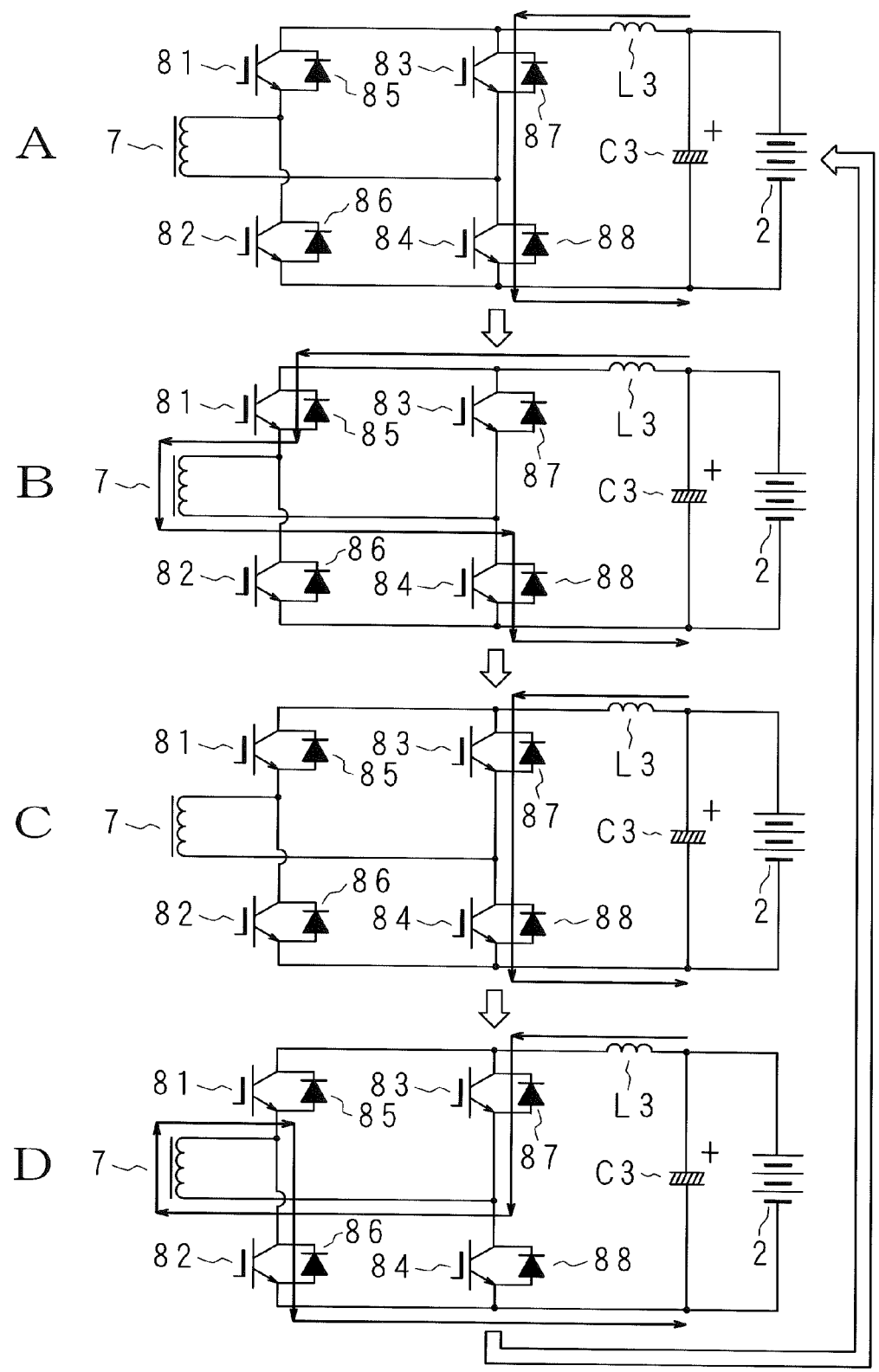
FIG. 15 is an explanatory view illustrating another operation example of the second full bridge circuit.

FIG. 15 is an explanatory view illustrating another operation example of the second full bridge circuit 8. For example, as illustrated in FIGS. 15B to 15D, prior to the switching from an energized state where the first and fourth switching elements 81 and 84 are in the ON state while the second and third switching elements 82 and 83 are in the OFF state, to an energized state where the first and fourth switching elements 81 and 84 are in the OFF state while the second and third switching elements 82 and 83 are in the ON state, temporarily, the first and second switching elements 81 and 82 are switched to be in the OFF state while the third and fourth switching elements 83 and 84 are switched to be in the ON state. As illustrated in FIGS. 15D to 15B, prior to the switching from an energized state where the first and fourth switching elements 81 and 84 are in the OFF state while the second and third switching elements 82 and 83 are in the ON state, to an energized state where the first and fourth switching elements 81 and 84 are in the ON state while the second and third switching elements 82 and 83 are in the OFF state, temporarily, the first and second switching elements 81 and 82 are switched to be in the OFF state while the third and fourth switching elements 83 and 84 are switched to be in the ON state.

By the switching control as described above, a functional effect similar to that in the switching control described with reference to FIGS. 10 and 11 may be obtained.

The bidirectional DC-AC conversion device 1 configured as described above performs predetermined switching control so that ripple current output from the battery 2 may be reduced without any increase in the capacitance of the capacitor 3.

Moreover, by varying the short-circuit duration ΔT in a sinusoidal form, it is possible to effectively reduce ripple current compared to the case where the duration ΔT varies in other waveforms.

Furthermore, in the case of the configuration in which the zero cross point of the AC voltage output from the bidirectional DC-AC conversion device 1 is synchronized with the duration for which the second full bridge circuit 8 is short-circuited, ripple current may effectively be reduced even if there is a difference between the control timing for the bidirectional DC-AC conversion circuit 4 and the phase of the AC voltage to be output.

In addition, by controlling the variation in the short-circuit duration ΔTn in synchronization with the control timing for the bidirectional DC-AC conversion circuit 4, the variation in the short-circuit duration may more easily be controlled compared to the case where the output AC voltage is detected to specify the phase thereof for controlling the synchronization timing.

Furthermore, the variation amplitude of the duration for which the leg of the second full bridge circuit 8 may be changed to control the amount of reduction in the ripple current.

In particular, in the case where the variation amplitude of the short-circuit duration ΔT is decided based on the electric power supplied from the bidirectional DC-AC conversion circuit 4, the amount of reduction in ripple current may be controlled without the need for the DC current detection part 90c capable of detecting ripple current.

Moreover, in the case where the ripple current is directly detected at the DC current detection part 90c and the variation amplitude of the short-circuit duration ΔT is changed so that the ripple current is reduced, it is possible to more accurately control the amount of reduction in the ripple current and thus to effectively reduce the ripple current, compared to the configuration where no detection of ripple current is performed.

Furthermore, according to the control method, control circuit 9 and control program 98, the coil L3 is interposed between the second full bridge circuit 8 and the capacitor C3, which can suppress the ripple current flowing into the capacitor C3 at the time of charging the battery 2. This can therefore prevent the ripple current from causing a damage to the capacitor C3.

Furthermore, at the time of discharging, the second full bridge circuit 8 is configured to be temporarily short-circuited at the time of reversing the phase of the AC voltage, so that either one of the first and third switching elements 81 and 83 of the second full bridge circuit 8 as well as either one of the second and fourth switching elements 82 and 84 are constantly in the ON state. Accordingly, the flow of current will not temporarily be blocked, and the energy accumulated in the coil L3 will not be applied to the second full bridge circuit 8 as surge voltage. This can prevent the second full bridge circuit 8 from being damaged due to surge voltage.

In addition, the short-circuited state where the first and second switching elements 81 and 82 of the second full bridge circuit 8 are in the ON state while the third and fourth switching elements 83 and 84 are in the OFF state, and the short-circuited state where the first and second switching elements 81 and 82 are in the OFF state while the third and fourth switching elements 83 and 84 are in the ON state occur alternately, which can prevent current from flowing in a specific switching element for a long period of time.

In addition, energy is accumulated in the coil L3 by temporarily short-circuiting the second full bridge circuit 8 and the energy accumulated in the coil L3 is discharged at the time of reversing the phase of the AC voltage, it is possible to raise the AC voltage.

Figure 16:
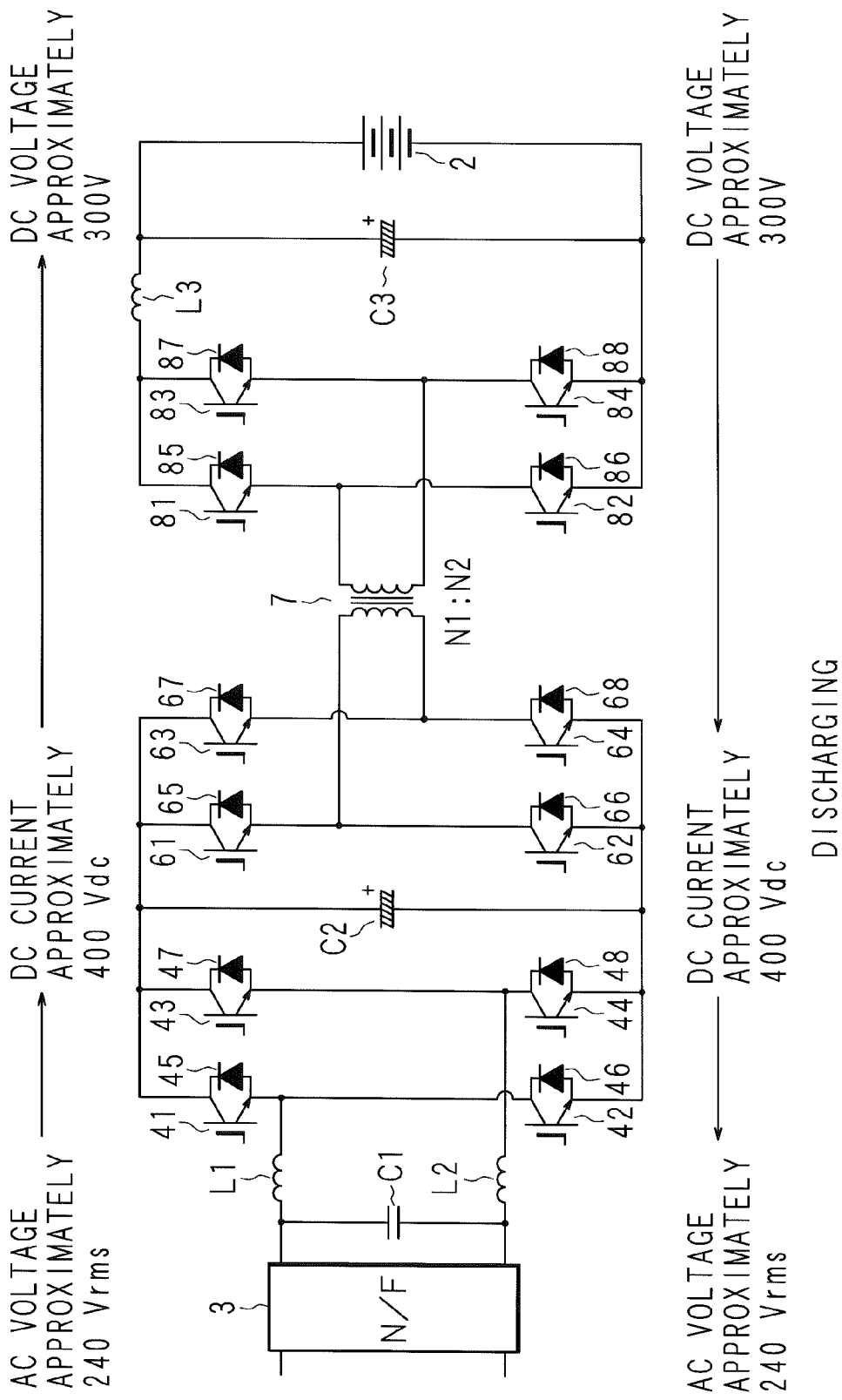
FIG. 16 is an operation explanatory view illustrating a voltage raising function of a bidirectional DC-AC conversion device.

FIG. 16 is an operation explanatory view illustrating a voltage raising function of the bidirectional DC-AC conversion device 1. It is assumed, for example, that the effective value of the AC voltage to be input/output is defined as 240 Vrms while the DC voltage to be input/output is defined as 300V. Considering the case of discharging, the turn ratio N1/N2 of the voltage converter 7 is the larger the better. In order to output the effective value of 240 Vrms, it is necessary to raise the DC voltage output from the first full bridge circuit 6 to approximately 400 Vdc. If, on the other hand, the turn ratio N1/N2 of the voltage converter 7 is too large, the DC voltage output from the second full bridge circuit 8 decreases, which hinders charging of the battery 2.

According to the present embodiment, at discharging, the switching control of the second full bridge circuit 8 can raise the DC voltage of the battery 2 and convert it into AC voltage, so that the turn ratio N1/N2 of the voltage converter 7 may be set large. Moreover, the level of voltage raise may be adjusted by changing the value of the predetermined duration $\Delta T_0$ stored in the storage part 93. As such, by adjusting the turn ratio N1/N2 and predetermined duration for the voltage converter 7, it is possible to input/output the AC voltage and DC voltage as defined.

The embodiments disclosed herein are to be construed as illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A DC-AC conversion device, comprising:
   a DC-DC conversion circuit having a full bridge circuit for bidirectionally performing AC-DC conversion on alternating current and direct current by switching control and converting DC voltage applied to a DC terminal pair of the full bridge circuit to output the converted DC voltage;
   a DC-AC conversion circuit converting DC voltage output from the DC-DC conversion circuit into AC voltage and outputting the converted AC voltage;
   a coil with one end connected to one terminal of the DC terminal pair;
   a capacitor connected between another end of the coil and another terminal of the DC terminal pair;
   a short-circuit control part controlling switching of the full bridge circuit so that a leg of the full bridge circuit is temporarily short-circuited;
   a phase reverse control part controlling switching of the full bridge circuit so that a phase of AC voltage output from the full bridge circuit is reversed, after the short-circuit control part temporarily short-circuits the leg of the full bridge circuit; and
   a short-circuit duration variation part varying a duration for which the leg of the full bridge circuit is short-circuited at a specific cycle according to a cycle of AC voltage output from the DC-AC conversion circuit.

2. The DC-AC conversion device according to claim 1, wherein
   the full bridge circuit includes:
   a first leg having a first switching element on a positive electrode side and a second switching element on a negative electrode side that are connected in series with each other; and
   a second leg having a third switching element on a positive electrode side and a fourth switching element on a negative electrode side that are connected in series with each other, and being connected in parallel with the first leg, and
   prior to mutual switching between an energized state where the first and fourth switching elements are in an ON state while the second and third switching elements are in an OFF state, and an energized state where the first and fourth switching elements are in the OFF state while the second and third switching elements are in the ON state, the short circuit control part temporarily switches the first and second switching elements to be in the ON state (or OFF state) and switches the third and fourth switching elements to be in the OFF state (or ON state).

3. The DC-AC conversion device according to claim 1, wherein
   a duration $\Delta T$ for which a leg of the full bridge circuit is short-circuited is represented by an equation (1) below, $$\Delta T = \Delta T_0 + A \cdot \sin(4\pi f t) \tag{1}$$

wherein $\Delta T$: duration for which a leg in a full bridge circuit is short-circuited $\Delta T_0$: predetermined duration A: variation amplitude of duration $\Delta t$ f: frequency of AC voltage output from a bidirectional DC-AC conversion circuit t: time.

4. The DC-AC conversion device according to claim 3, wherein
   the short-circuit duration varying part synchronizes timing at which a phase of AC voltage output from the DC-AC conversion circuit is reversed with timing at which a rate of change in an amount of variation in the duration for which a leg of the full bridge circuit is short-circuited is at a maximum.

5. The DC-AC conversion device according to claim 3, further comprising a voltage detection part detecting AC voltage output from the DC-AC conversion circuit, wherein
   the short-circuit duration varying part synchronizes a zero cross point of AC voltage detected by the voltage detection part with timing at which a rate of change in an amount of variation in the duration for which a leg of the full bridge circuit is short-circuited.

6. The DC-AC conversion device according to claim 3, wherein
   the short-circuit duration varying part includes an amplitude changing part changing a variation amplitude of a duration for which a leg of the full bridge circuit is short-circuited.

7. The DC-AC conversion device according to claim 6, further comprising a current detection part detecting current input to the DC terminal pair, wherein
   the amplitude changing part increases the variation amplitude in a case where ripple current included in the current detected at the current detection part is in a same phase as a phase of AC voltage output from the DC-AC conversion circuit, and decreases the variation amplitude in a case where ripple current has an opposite phase to the phase of AC voltage output from the DC-AC conversion circuit.

8. The DC-AC conversion device according to claim 1, further comprising:
- a storage part storing information in which electric power supplied from the DC-AC conversion circuit is associated with the variation amplitude;
- a power calculation part calculating electric power based on AC voltage and AC current output from the DC-AC conversion circuit; and
- an amplitude deciding part deciding the variation amplitude based on the electric power calculated by the power calculation part and information stored in the storage part.

9. A control circuit controlling operation of a DC-AC conversion device, comprising:
- a DC-DC conversion circuit having a full bridge circuit for bidirectionally performing AC-DC conversion on alternating current and direct current by switching control and converting DC voltage applied to a DC terminal pair of the full bridge circuit to output the converted voltage;
- a DC-AC conversion circuit converting DC voltage output from the DC-DC conversion circuit into AC voltage and outputting the converted AC voltage;
- a coil with one end connected to one terminal of the DC terminal pair;
- a capacitor connected between another end of the coil and another terminal of the DC terminal pair;
- a short-circuit control part controlling switching of the full bridge circuit so that a leg of the full bridge circuit is temporarily short-circuited;
- a phase reverse control part controlling switching of the full bridge circuit so that a phase of AC voltage output from the full bridge circuit is reversed, after the short-circuit control part temporarily short-circuits a leg of the full bridge circuit; and
- a short-circuit duration varying part varying a duration for which a leg of the full bridge circuit is short-circuited at a specific cycle according to a cycle of AC voltage output from the DC-AC conversion circuit.

10. A controlling method for controlling operation of a DC-AC conversion device including a DC-DC conversion circuit having a full bridge circuit for bidirectionally performing AC-DC conversion on alternating current and direct current by switching control, converting DC voltage applied to a DC terminal pair of the full bridge circuit and outputting the converted voltage, a DC-AC conversion circuit converting DC voltage output from the DC-DC conversion circuit into AC voltage and outputting the converted AC voltage, a coil with one end connected to one terminal of the DC terminal pair, and a capacitor connected between another end of the coil and another terminal of the DC terminal pair, the method comprising:
- controlling switching of the full bridge circuit so that a leg of the full bridge circuit is temporarily short-circuited;
- controlling switching of the full bridge circuit so that a phase of AC voltage output from the full bridge circuit is reversed, after a leg of the full bridge circuit is temporarily short-circuited; and
- varying a duration for which a leg of the full bridge circuit is short-circuited at a specific cycle according to a cycle of AC voltage output from the DC-AC conversion circuit.

* * * * *